US009560536B2

(12) United States Patent
Ji et al.

(10) Patent No.: US 9,560,536 B2
(45) Date of Patent: Jan. 31, 2017

(54) METHOD AND DEVICE FOR REPORTING CELL INFORMATION AND ADJUSTING CELL MOBILITY PARAMETER

(71) Applicant: Huawei Technologies Co., Ltd., Shenzhen (CN)

(72) Inventors: Li Ji, Shanghai (CN); Shukun Wang, Shenzhen (CN); Yanyan Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 339 days.

(21) Appl. No.: 14/156,081

(22) Filed: Jan. 15, 2014

(65) Prior Publication Data

US 2014/0128058 A1 May 8, 2014

Related U.S. Application Data

(63) Continuation of application No. PCT/CN2012/078659, filed on Jul. 14, 2012.

(30) Foreign Application Priority Data

Jul. 15, 2011 (CN) .......................... 2011 1 0199209
May 16, 2012 (CN) .......................... 2012 1 0151979

(51) Int. Cl.
H04W 24/00 (2009.01)
H04W 24/04 (2009.01)
(Continued)

(52) U.S. Cl.
CPC ........... *H04W 24/04* (2013.01); *H04W 76/028* (2013.01); *H04W 88/02* (2013.01); *H04W 88/08* (2013.01)

(58) Field of Classification Search
CPC ........... H04W 76/028; H04W 36/0083; H04W 24/10; H04W 36/0055; H04W 24/02; H04W 88/08; H04W 24/04; H04W 88/02
See application file for complete search history.

(56) References Cited

U.S. PATENT DOCUMENTS

2010/0124918 A1    5/2010  Agashe et al.
2010/0173633 A1*   7/2010  Catovic ............... H04W 76/027
                                                        455/436
(Continued)

FOREIGN PATENT DOCUMENTS

CN    101836478 A    9/2010
CN    102111781 A    6/2011
(Continued)

OTHER PUBLICATIONS

Chinese Patent Cooperation Treaty (PCT) Search Report, Application No. PCT/CN2012/078659, date Jul. 15, 2011, 13 pages.
(Continued)

*Primary Examiner* — Ajit Patel
(74) *Attorney, Agent, or Firm* — Slater Matsil, LLP

(57) ABSTRACT

Embodiments of the present invention provide a method and a device for reporting cell information and adjusting a cell mobility parameter. The method for reporting cell information includes a connection failure occurring on a terminal and re-establishing a radio resource control RRC connection with a cell by the terminal. A cell identity of a neighboring cell of a source cell and event information of the neighboring cell that is recorded by the terminal before the connection failure occurs is sent by the terminal to a base station that controls a cell where the RRC connection is re-established. Technical solutions provided in embodiments of the present invention may help improve the accuracy of mobility parameter adjustment on a network side and further improve the terminal handover efficiency.

21 Claims, 8 Drawing Sheets

(51) Int. Cl.
*H04W 76/02* (2009.01)
*H04W 88/02* (2009.01)
*H04W 88/08* (2009.01)

(56) References Cited

U.S. PATENT DOCUMENTS

| | | | |
|---|---|---|---|
| 2010/0184438 A1* | 7/2010 | Wu | H04W 36/0055 455/436 |
| 2011/0077010 A1 | 3/2011 | Xu et al. | |
| 2011/0117905 A1* | 5/2011 | Huang | H04W 76/028 455/422.1 |
| 2011/0207485 A1* | 8/2011 | Dimou | H04W 36/0055 455/507 |
| 2011/0269426 A1* | 11/2011 | Hultin | H04W 12/10 455/411 |
| 2012/0314566 A1* | 12/2012 | Lee | H04W 76/028 370/225 |
| 2014/0194123 A1 | 7/2014 | Wang et al. | |

FOREIGN PATENT DOCUMENTS

| | | |
|---|---|---|
| EP | 2418914 A1 | 2/2012 |
| EP | 2506654 A1 | 10/2012 |
| JP | 2012509617 | 4/2012 |
| JP | 2012514948 | 6/2012 |
| JP | 2012518923 | 8/2012 |
| WO | 2009052686 A1 | 4/2009 |
| WO | 2010080848 A1 | 7/2010 |
| WO | 2010094236 A1 | 8/2010 |
| WO | 2010121418 A1 | 10/2010 |

OTHER PUBLICATIONS

Nokia Corporation, Nokia Siemens Networks: 'MDT Mobility Optimization' 3GPP TSG-RAN WG2 Meeting #67BIS, R2-095637 Oct. 12-16, 2009, 8 pages.

LTE, "3rd Generation Partnership Project; Technical Specification Group Radio Access Network; Evolved Universal Terrestrial Radio Access (EUTRA) and Evolved Universal Terrestrial Radio Access Network (E-UTRAN); Overall description; Stage 2 (Release 10)," 3GPP TS 36.300 v.10.4.0, Jun. 2011, 194 pages.

LTE, "3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331 v10.2.0, Jun. 2011, 294 pages.

LTE, "3rd Generation Partnership Project; Technical Specification Group Radio Access Network; Evolved Universal Terrestrial Radio Access Network (E-UTRAN); Self-configuring and self-optimizing network (SON) use cases and solutions (Release 9)," 3GPP TR 36.902 v.9.3.1, Mar. 2011, 22 pages.

Huawei, "UE RLF report," 3GPP TSG-RAN WG2 Meeting #69bis, R2-102018, Apr. 16, 2014, 2 pages.

Huawei, "UE RLF report," 3GPP TSG-RAN WG2 Meeting #70, R2-102913, May 14, 2010, 4 pages.

Huawei, China Unicom, "UE RACH failure reporting" 3GPP TSG-RAN WG2 Meeting #71, R2-104676, Aug. 23-27, 2010, 2 pages.

Huawei, "UE RLF report for Mobility Robustness Optimisation," 3GPP TSG-RAN WG3 #67, R3-100899, Feb. 22-26, 2010, 4 pages.

* cited by examiner

METHOD AND DEVICE FOR REPORTING CELL INFORMATION AND ADJUSTING CELL MOBILITY PARAMETER

This application is a continuation of International Application No. PCT/CN2012/078659, filed on Jul. 14, 2012, which claims priority to Chinese Patent Application No. 201110199209.1, filed on Jul. 15, 2011, and Chinese Patent Application No. 201210151979.3, filed on May 16, 2012, all of which are hereby incorporated by reference in their entireties.

TECHNICAL FIELD

The present invention relates to the field of communications technologies, and in particular to a method and a device for reporting cell information and adjusting a cell mobility parameter.

BACKGROUND

In a 3rd Generation Partnership Project (3GPP) Long Term Evolution (LTE) system, a base station that controls a source cell of a terminal, that is, a source evolved NodeB (eNB), delivers measurement configuration information to the terminal to instruct the terminal to measure signal quality of the source cell and that of a neighboring cell of the source cell. When the signal quality of the neighboring cell meets a handover condition, the terminal reports a measurement result to the source eNB, and the source eNB determines whether to perform a handover according to a measurement report reported by the terminal. A mobility parameter of the neighboring cell in the measurement configuration information directly affects the measurement result reported by the terminal and then affects a success rate of the handover.

In the prior art, the mobility parameter of the neighboring cell is incorrectly adjusted by the source eNB, thereby affecting the terminal handover efficiency.

SUMMARY OF THE INVENTION

In one aspect, the present invention provides a method for reporting cell information. The method includes a connection failure occurring on a terminal and re-establishing a radio resource control RRC connection with a cell by the terminal. A cell identity of a neighboring cell of a source cell and event information of the neighboring cell that is recorded by the terminal before the connection failure occurs is sent by the terminal to a base station that controls the cell where the RRC connection is re-established.

In another aspect, the present invention further provides another method for adjusting a cell mobility parameter, including: acquiring a cell identity of a neighboring cell of the source cell that is reported by a terminal after a connection failure occurs and event information of the neighboring cell that is recorded by the terminal before the connection failure occurs by a base station that controls a source cell. A mobility parameter of the neighboring cell is adjusted by the base station that controls the source cell according to the event information of the neighboring cell that is recorded by the terminal before the connection failure occurs.

In still another aspect, the present invention provides a terminal including a detecting unit configured to detect that a connection failure occurs on a terminal. A re-establishing unit is configured to re-establish a radio resource control RRC connection when the detecting unit detects that a connection failure occurs on the terminal. A sending unit is configured to send a cell identity of a neighboring cell of a source cell and event information of the neighboring cell that is recorded by the terminal before the connection failure occurs to a base station that controls the cell where the RRC connection is re-established.

In still another aspect, the present invention further provides a base station including an acquiring unit configured to acquire a cell identity of a neighboring cell of a source cell that is reported by a terminal after a connection failure occurs and event information of the neighboring cell that is recorded by the terminal before the connection failure occurs. An adjusting unit is configured to adjust a mobility parameter of the neighboring cell according to the event information of the neighboring cell that is recorded by the terminal before the connection failure occurs and acquired by the acquiring unit. A sending unit is configured to send the mobility parameter of the neighboring cell adjusted by the adjusting unit to the terminal.

In the preceding technical solution, when a connection failure occurs on a terminal, the terminal re-establishes a radio resource control (RRC) connection and sends a cell identity of a neighboring cell of a source cell and event information of the neighboring cell that is recorded by the terminal before the connection failure occurs to a base station that controls a cell where the RRC connection is re-established. This enables the base station that controls the cell where the RRC connection is re-established to forward, to a base station that controls the source cell, the cell identity of the neighboring cell of the source cell and the event information of the neighboring cell that is recorded by the terminal before the connection failure occurs. Then, the base station that controls the source cell may adjust a mobility parameter of the neighboring cell according to an event undergone by the neighboring cell and send the adjusted mobility parameter to the terminal. This further improves the accuracy of mobility parameter adjustment and the terminal handover efficiency. It should be noted that if the cell where the RRC connection is re-established and the source cell belong to a same base station, the source base station may directly obtain the cell identity of the neighboring cell of the source cell and the event information of the neighboring cell that is recorded by the terminal before the connection failure occurs, and adjust the mobility parameter of the neighboring cell.

In one aspect, the present invention provides a method for reporting cell information. The method includes a connection failure occurring on a terminal and re-establishing a radio resource control (RRC) connection within a cell by the terminal. A cell identity of a source cell and event information of the source cell that is recorded by the terminal before the connection failure occurs is sent by the terminal to a base station that controls a cell where the RRC connection is re-established. A cell identity of a neighboring cell of the source cell and event information of the neighboring cell that is recorded by the terminal before the connection failure occurs is sent by the terminal to the base station that controls the cell where the RRC connection is re-established. The neighboring cell and the source cell are inter-frequency cells or inter-system cells. The cell identity of the source cell, event information of the source cell that is recorded by the terminal before the connection failure occurs, the cell identity of the neighboring cell of the source cell, and event information of the neighboring cell that is recorded by the terminal before the connection failure occurs are sent by the terminal to the base station that controls the cell where the RRC connection is re-established. The neighboring cell and the source cell are inter-frequency cells or inter-system cells.

In another aspect, the present invention further provides another method for adjusting a cell mobility parameter including receiving, by a base station that controls a cell where the RRC connection is re-established, information reported by the terminal after a connection failure occurs and a terminal re-establishes an RRC connection. The information reported by the terminal is forwarded, by the base station that controls the cell where the RRC connection is re-established, to a base station that controls a source cell. The information reported by the terminal includes a cell identity of the source cell and event information of the source cell that is recorded by the terminal before the connection failure occurs. Alternatively, the information reported by the terminal includes a cell identity of a neighboring cell of the source cell and event information of the neighboring cell that is recorded by the terminal before the connection failure occurs. Alternatively, the information reported by the terminal includes a cell identity of the source cell, event information of the source cell that is recorded by the terminal before the connection failure occurs, a cell identity of the neighboring cell of the source cell, and event information of the neighboring cell that is recorded by the terminal before the connection failure occurs. The neighboring cell and the source cell are inter-frequency cells or inter-system cells.

In still another aspect, the present invention provides a terminal including a detecting unit configured to detect that a connection failure occurs on a terminal. A re-establishing unit is configured to re-establish a radio resource control RRC connection when the detecting unit detects that a connection failure occurs on the terminal. A sending unit is configured to send a cell identity of a source cell and event information of the source cell that is recorded by the terminal before the connection failure occurs to a base station that controls a cell where an RRC connection is re-established. Alternatively, the sending unit is configured to send, to a base station that controls a cell where an RRC connection is re-established, a cell identity of a neighboring cell of the source cell and event information of the neighboring cell that is recorded by the terminal before a connection failure occurs. The neighboring cell and the source cell are inter-frequency cells or inter-system cells. Alternatively, the sending unit is configured to send, to the base station that controls the cell where the RRC connection is re-established, a cell identity of the source cell, event information of the source cell that is recorded by the terminal before the connection failure occurs, a cell identity of the neighboring cell of the source cell, and the event information of the neighboring cell that is recorded by the terminal before the connection failure occurs. The neighboring cell and the source cell are inter-frequency cells or inter-system cells.

In still another aspect, the present invention further provides a base station including a receiving unit configured to receive information reported by the terminal after a connection failure occurs and a terminal re-establishes an RRC connection. A forwarding unit is configured to forward the information reported by the terminal to a base station that controls a source cell. The information reported by the terminal includes a cell identity of the source cell and event information of the source cell that is recorded by the terminal before the connection failure occurs. Alternatively, the information reported by the terminal includes a cell identity of a neighboring cell of the source cell and event information of the neighboring cell that is recorded by the terminal before the connection failure occurs. Alternatively, the information reported by the terminal includes a cell identity of the source cell, event information of the source cell that is recorded by the terminal before the connection failure occurs, a cell identity of the neighboring cell of the source cell, and event information of the neighboring cell that is recorded by the terminal before the connection failure occurs. The neighboring cell and the source cell are inter-frequency cells or inter-system cells.

According to the preceding technical solutions, when a connection failure occurs on a terminal, the terminal re-establishes a radio resource control RRC connection and sends, to a base station that controls a cell where the RRC connection is re-established, a cell identity of a source cell and event information of the source cell that is recorded by the terminal before the connection failure occurs. Alternatively, the terminal sends, to the base station that controls the cell where the RRC connection is re-established, a cell identity of a neighboring cell that is at a frequency or in a communications system different from the source cell and event information of the neighboring cell. Alternatively, the terminal sends, to the base station that controls the cell where the RRC connection is re-established, a cell identity of a source cell, event information of the source cell, and a cell identity of a neighboring cell and event information of the neighboring cell to a base station that controls a cell where the RRC connection is re-established, so that the base station that controls the cell where the RRC connection is re-established forwards the information reported by the terminal to a base station that controls the source cell, and then, the base station that controls the source cell may adjust a mobility parameter according to an event undergone by the source cell and/or an event undergone by the neighboring cell that is at a frequency or in a system different from the source cell, thereby improving the accuracy of mobility parameter adjustment and the terminal handover efficiency.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
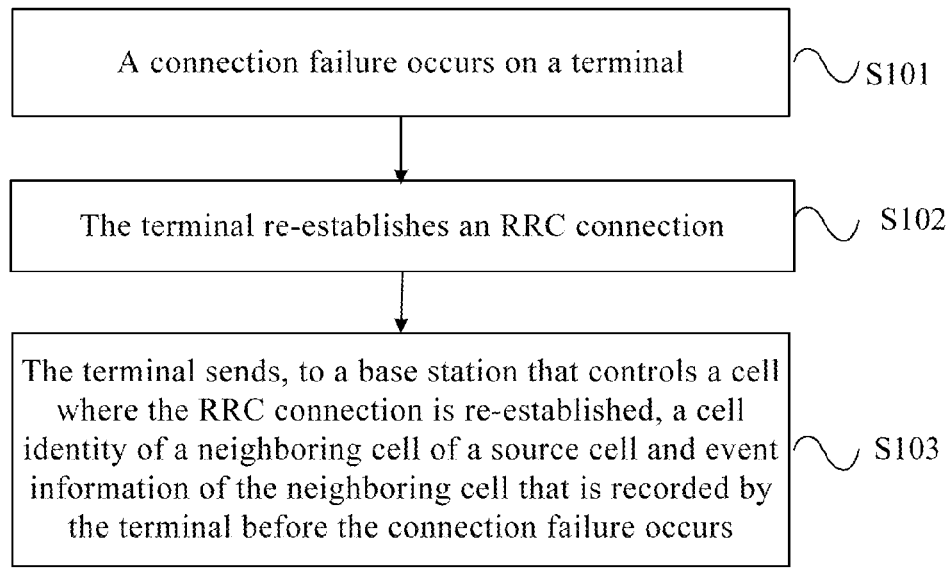
FIG. 1 is a schematic flowchart of a method for reporting cell information according to an embodiment of the present invention.

FIG. 1 is a flowchart of a method for reporting cell information according to an embodiment of the present invention. As shown in FIG. 1, the method includes the following content.

S101. A connection failure (connection failure) occurs on a terminal.

Alternatively, the connection failure that occurs on the terminal may be a radio link failure (RLF) that occurs in a source cell of the terminal, and may also be a handover failure (HOF) that occurs on the terminal.

In each embodiment of the present invention, a terminal may be a user equipment (UE), for example, a radio communications device, a handheld device, or a cordless phone.

S102. The terminal re-establishes a radio resource control (RRC) connection.

In this embodiment, the terminal may re-establish the RRC connection in the source cell, may also re-establish the RRC connection in a handover target cell where a handover failure occurs, and may still re-establish the RRC connection in a third cell other than the source cell and the handover target cell.

S103. The terminal sends, to a base station that controls a cell where the RRC connection is re-established, a cell identity of a neighboring cell of the source cell and event information of the neighboring cell that is recorded by the terminal before the connection failure occurs.

The cell where the RRC connection is re-established may be the handover target cell where the handover failure occurs, or the source cell, or the third cell other than the source cell and the handover target cell.

For ease of description, the "event information of the neighboring cell recorded by the terminal before the connection failure occurs" may also be called "event information of the neighboring cell", a base station that controls the source cell may be called a source base station, a base station that controls the handover target cell may be called a handover target base station, and a base station that controls the third cell may be called a third base station.

Alternatively, the event information of the neighboring cell includes one of the following information: initial status information, meeting a signal quality threshold, time to trigger (TTT) timeout, and the terminal receiving a handover command.

As an alternative embodiment, the connection failure that occurs on the terminal is an RLF. In such a case, if, before the RLF occurs on the terminal, signal quality of the neighboring cell of the source cell does not meet a preset signal quality threshold, the event information of the neighboring cell is: initial status information. However, if, before the RLF occurs on the terminal, signal quality of the neighboring cell of the source cell meets a preset signal quality threshold and TTT does not expire, the event information of the neighboring cell is meeting the signal quality threshold. Alternatively, if, before the RLF occurs on the terminal, the time when signal quality of the neighboring cell of the source cell meets a preset signal quality threshold exceeds a preset TTT length, the event information of the neighboring cell is TTT timeout.

As another alternative embodiment, if the connection failure that occurs on the terminal is an HOF and the terminal has received, when the HOF occurs on the terminal, a handover command sent by the source base station, the event information of the neighboring cell is the terminal receiving a handover command. Alternatively, if, when the HOF occurs on the terminal, the terminal has sent a preamble message to the handover target base station, the event information of the neighboring cell is the terminal sending a preamble. Alternatively, if, when the HOF occurs on the terminal, the terminal has received a preamble response message returned by the handover target base station, the event information of the neighboring cell is the terminal acquiring a preamble response. Alternatively, if, when the HOF occurs on the terminal, the terminal has sent a first uplink scheduling message to the handover target base station, the event information of the neighboring cell is the terminal sending a scheduling message. Alternatively, if, when the HOF occurs on the terminal, the terminal has received information that instructs how to resolve a collision and is returned by the handover target base station, the event information of the neighboring cell is the terminal receiving the information that instructs how to resolve a collision. Alternatively, if, when the HOF occurs on the terminal, the terminal has received configured preamble information delivered by the handover target base station, the event information of the neighboring cell is the terminal receiving configured preamble information.

In each of the preceding embodiments, the source cell may have one or more neighboring cells. For example, if cell A is a source cell, cell A may have one or more neighboring cells, including cell B, cell C, cell D, and cell E. The following uses cell B, cell C, cell D, and cell E as neighboring cells of cell A for description.

Event information of each neighboring cell recorded by the terminal before the connection failure occurs may separately be TTT timeout, meeting a signal quality threshold, initial status, and the terminal receiving a handover command. As an alternative embodiment, in S103, the terminal may send Table 1 to a target base station.

TABLE 1

| Cell identity | Event information |
| --- | --- |
| Cell B | TTT timeout |
| Cell C | Meeting a signal quality threshold |
| Cell D | Initial status information |
| Cell E | The terminal receiving a handover command |

It can be seen from Table 1 that before the RLF occurs, the event information corresponding to cell B recorded by the terminal is TTT timeout, the recorded event information corresponding to cell C is meeting a signal quality threshold, the recorded event information corresponding to cell D is initial status information, and the recorded event information corresponding to cell E is the command has received a handover command. The following describes, by using Table 1 as an example, a process for recording, by the terminal, the event information of the neighboring cell.

Firstly, the terminal sets the event information of the neighboring cell to initial status information, where initialization information may also be called initial status of the event information of the neighboring cell. For example, the terminal sets event information of all the 4 neighboring cells in Table 1 to initial status information.

For cell D: If no events occur in cell D before the RLF occurs on the terminal, that is, a signal quality threshold of cell D does not meet a preset signal quality threshold, event information of cell D that is sent by the terminal to the target base station after the RLF occurs is initial status information, for example, the event information corresponding to cell D in Table 1.

For cell C: If, before the RLF occurs on the terminal, the measured signal quality of cell C meets a preset signal quality threshold and TTT does not expire, the terminal updates event information corresponding to cell C from initial status information to meeting the signal quality threshold. Event information of cell C that is sent by the terminal to the target base station after the RLF occurs is meeting the signal quality threshold, for example, the event information corresponding to cell C in Table 1.

For cell B: If, before the RLF occurs on the terminal, the measured signal quality of cell B meets a preset signal quality threshold and TTT does not expire, the terminal updates event information corresponding to cell B from initial status information to meeting the signal quality threshold; and if the time when cell B meets the preset signal quality threshold exceeds a preset TTT length, that is, TTT timeout, the terminal then updates the event information corresponding to cell B from meeting the signal quality threshold to TTT timeout. The event information of cell B that is sent by the terminal to the target base station after the RLF occurs is TTT timeout, for example, the event information corresponding to cell B in Table 1.

For cell E: If, before the RLF occurs on the terminal, the measured signal quality of cell E meets a preset signal quality threshold and TTT does not expire, the terminal updates event information corresponding to cell E from initial status information to meeting the signal quality threshold; and if the time when cell E meets the preset signal quality threshold exceeds a preset TTT length, that is, TTT timeout, the terminal then updates the event information corresponding to cell E from meeting the signal quality threshold to TTT timeout; and if the terminal has received a handover command sent by the source base station before the HOF occurs, the terminal then updates the event information corresponding to cell E from TTT timeout to the terminal receiving a handover command. The event information of cell E that is sent by the terminal to the target base station after the HOF occurs on the terminal is the terminal receiving a handover command, for example, the event information corresponding to cell E in Table 1.

It can be seen from the process for recording event information by the terminal that when a new event occurs, the terminal replaces original event information with new event information. Therefore, the event information of the neighboring cell indicates an event that recently occurs in and relates to the neighboring cell, where the event information of the neighboring cell is reported by the terminal to the target base station after the RLF or HOF occurs.

Alternatively, the preceding cell identity may be a physical identity (ID) of a cell, may also be a cell global identifier (CGI), and may still be a physical ID and CGI. The event information may be represented by an event identity. For example, it may be represented by a numeral, a letter, a character string, or any combination thereof. Each event has a unique event identity. For example, an initial status is represented by "0", meeting a signal quality threshold is represented by "1", TTT timeout is represented by "2", and the terminal receiving a handover command is represented by "3"; or an initial status is represented by "00", meeting the signal quality threshold is represented by "01", TTT timeout is represented by "10", and the terminal receiving a handover command is represented by "11".

As another alternative embodiment, the terminal may further send one or more of the following parameters delivered by the source base station to the target base station: a timer T310, which is configured to determine whether an RLF occurs; a number of times N310, which is configured to determine whether to enable out-of-synchronization indication of the timer; a number of times N311, which is configured to determine whether to disable synchronization indication of the timer; the maximum retransmission attempts at a radio link control layer; and the maximum preamble retransmission attempts.

In each embodiment of the present invention, a source base station and a target base station may be evolved base stations eNBs, base stations (BS), NodeBs (Node B), access points (AP), or the like. A source base station and a target base station may be macro base stations, may also be medium-sized base stations, and may still be micro base stations, for example, home base stations.

According to the technical solution provided in this embodiment, when a connection failure occurs on a terminal, the terminal re-establishes an RRC connection and sends to a base station that controls a cell where the RRC connection is re-established, a cell identity of a neighboring cell of a source cell and event information of the neighboring cell that is recorded by the terminal before the connection failure occurs. This enables the base station that controls the cell where the RRC connection is re-established to forward, to a source base station, the cell identity of the neighboring cell of the source cell and the event information of the neighboring cell that is recorded by the terminal before the connection failure occurs. Then, the source base station may adjust a mobility parameter of the neighboring cell according to an event undergone by the neighboring cell, and send the adjusted mobility parameter to the terminal, thereby improving the accuracy of mobility parameter adjustment and the terminal handover efficiency. It should be noted that if the cell where the RRC connection is re-established and the source cell belong to a same base station, the source base station may directly obtain the cell identity of the neighboring cell of the source cell and the event information of the neighboring cell that is recorded by the terminal before the connection failure occurs, and adjust the mobility parameter of the neighboring cell.

Figure 2:
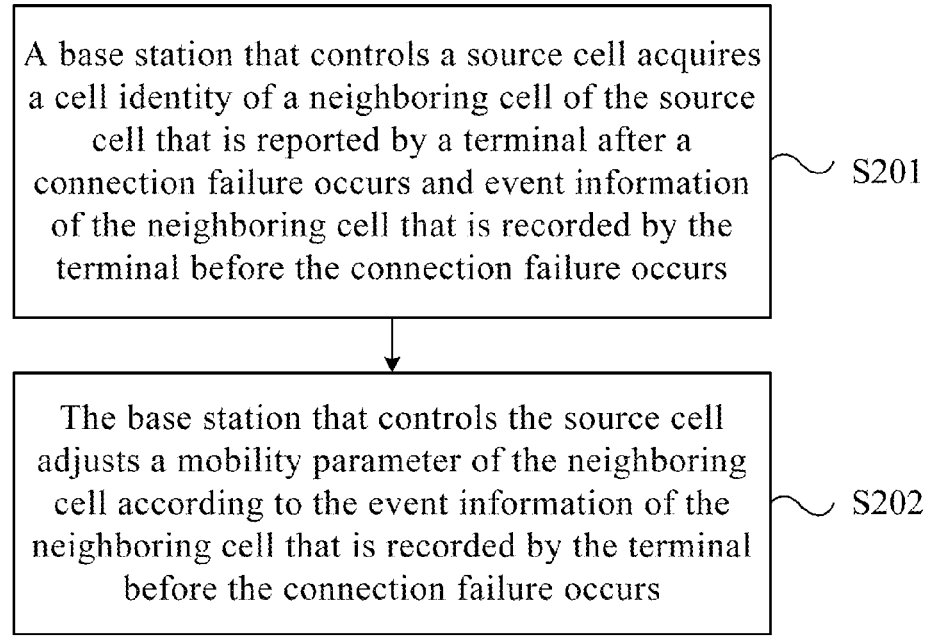
FIG. 2 is a schematic flowchart of a method for adjusting a cell mobility parameter according to an embodiment of the present invention.

FIG. 2 is a flowchart of a method for adjusting a cell mobility parameter according to an embodiment of the present invention. As shown in FIG. 2, the method includes the following content:

S201. A base station that controls a source cell acquires a cell identity of a neighboring cell of the source cell that is reported by a terminal after a connection failure occurs and event information of the neighboring cell that is recorded by the terminal before the connection failure occurs.

In S201, the cell identity of the neighboring cell of the source cell and the event information of the neighboring cell are reported by the terminal to a base station that controls a cell where an RRC connection is re-established, where the event information of the neighboring cell is recorded by the terminal before the connection failure occurs. For content about a specific report process, reference may be made to the content in the embodiment shown in FIG. 1, and no further details are provided herein.

Alternatively, if the cell where the RRC connection is re-established after the connection failure occurs on the terminal and the source cell belong to a same base station, the base station that controls the source cell receives, after the terminal re-establishes the RRC connection, the cell identity of the neighboring cell of the source cell that is reported by the terminal and the event information of the neighboring cell that is recorded by the terminal before the connection failure occurs. If the cell where the RRC connection is re-established after the connection failure occurs on the terminal and the source cell belong to different base stations, the base station that controls the source cell receives, after the terminal re-establishes the RRC connection, a cell identity of the neighboring cell of the source cell that is forwarded by the base station that controls the cell where the RRC connection is re-established and the event information of the neighboring cell that is recorded by the terminal before the connection failure occurs.

S202. The base station that controls the source cell adjusts a mobility parameter of the neighboring cell according to the event information of the neighboring cell that is recorded by the terminal before the connection failure occurs.

For example, if the number of times that event information of the neighboring cell is initial status information exceeds a preset threshold, a signal quality threshold in mobility parameters of the neighboring cell is decreased; and if the number of times that event information of the neighboring cell is meeting a signal quality threshold exceeds a preset threshold, a TTT length in mobility parameters of the neighboring cell is reduced.

It should be noted that a source base station may receive event information of a neighboring cell that is reported by one or more terminals. Therefore, the source base station may collect statistics about a condition of the event information of the neighboring cell that is sent by one or more terminals over a period of time. For example, if event information of a certain neighboring cell sent by one terminal over a period of time is initial status information, this indicates that the neighboring cell does not meet a preset signal quality threshold over the period of time, that is, no events occur; or if more than 90% of event information of the neighboring cell reported by multiple terminals over a period of time is initial status information, this indicates that a preset signal quality threshold of the neighboring cell may be set to an excessively high value, and in this case, the source base station may properly adjust a parameter related to the preset signal quality threshold of the neighboring cell and includes a cell specified offset (Ocn), a measurement event offset, or the like, thereby decreasing a value of the preset signal quality threshold. For another example, if more than 90% of event information of a certain neighboring cell reported by one or more terminals over a period of time is meeting a preset signal quality threshold, this indicates that a TTT length of the neighboring cell may be excessively long, and in this case, the source base station may properly shorten the TTT length of the neighboring cell. The preceding is only two specific examples of adjusting, by the source base station, a mobility parameter of the neighboring cell. However, the present invention is not limited to this. It may be understood that the source base station may adjust a mobility parameter of a corresponding neighboring cell according to the event information of the neighboring cell that is reported by one or more terminals over a period of time, thereby adjusting the mobility parameter of the neighboring cell in a more accurate manner and improving the terminal handover efficiency.

According to the technical solution provided in this embodiment, a source base station acquires a cell identity of a neighboring cell of a source cell that is reported by a terminal after a connection failure occurs and event information of the neighboring cell that is recorded by the terminal before the connection failure occurs, so that the source base station may adjust a mobility parameter of the neighboring cell according to the event information of the neighboring cell and send the adjusted mobility parameter to the terminal, thereby improving the accuracy of mobility parameter adjustment and the terminal handover efficiency.

Figure 3:
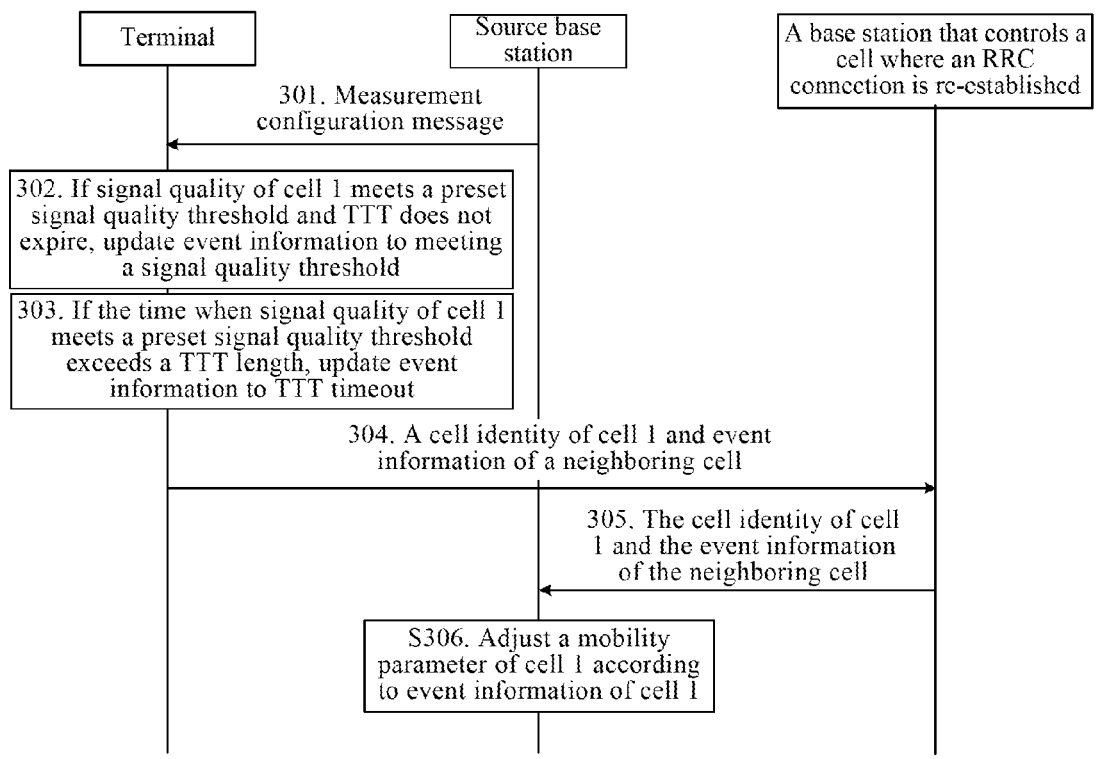
FIG. 3 is a schematic flowchart of a method according to another embodiment of the present invention.

The following is an embodiment shown in FIG. 3. This embodiment further describes in detail the technical solutions in the embodiments shown in FIG. 1 and FIG. 2 by using the following scenario as an example: An RLF occurs between a terminal and a source base station before the terminal receives a handover command sent by the source base station. This embodiment specifically includes the following content:

S301. The terminal receives measurement configuration information sent by the source base station and measures a source cell (that is, a current serving cell) and a neighboring cell according to the measurement configuration information.

The terminal receives the measurement configuration information delivered by the source base station, where the measurement configuration information instructs the terminal to measure signal quality of the source cell and the neighboring cell, and the measurement configuration information includes a mobility parameter of the neighboring cell. There may be one or more neighboring cells. The mobility parameters may include a signal quality threshold, for example, an A3 threshold, where the A3 threshold is a signal quality threshold and is specifically an event threshold that is used to report a measurement report and defined in the 3GPP 36.331 standard. Signal quality may be reference signal received power (RSRP), reference signal received quality (RSRQ), or the like. The mobility parameter may further include a TTT length, and if the time when signal quality of the neighboring cell meets a preset signal quality threshold exceeds the TTT length, the terminal reports a measurement report to the source base station.

To briefly describe the method for adjusting a cell mobility parameter provided in the present invention, this embodiment uses the following scenario as an example: Cell 1 is a neighboring cell. In practice, the terminal may measure multiple neighboring cells.

S302. If the measured signal quality of cell 1 meets a preset signal quality threshold, the terminal enables TTT and, when the TTT does not expire, updates event information corresponding to a cell identity of cell 1 from initial status information to meeting a signal quality threshold. The signal quality threshold in this embodiment may be an A3 threshold.

The preset signal quality threshold is a preset threshold indicated in the measurement configuration information delivered by the source base station.

In this embodiment, a default initial value of the event information corresponding to the cell identity of cell 1 is initial status information. When the signal quality of cell 1 meets the preset signal quality threshold, the terminal updates the event information corresponding to the cell identity of cell 1 from initial status information to meeting a signal quality threshold.

If signal quality of multiple neighboring cells of the terminal all meets the preset signal quality threshold, the terminal updates event information corresponding to a cell identity of each neighboring cell from initial status information to meeting a signal quality threshold.

S303. If the TTT set for cell 1 expires, that is, signal quality of cell 1 meets the preset signal quality threshold within the TTT, the terminal updates the event information corresponding to the cell identity of cell 1 to TTT timeout, and terminal reports a measurement report to the source base station.

The TTT length may be a TTT length indicated in the measurement configuration information delivered by the source base station.

S304. An RLF occurs in the source cell of the terminal, the terminal re-establishes an RRC connection, and the terminal reports the cell identity of cell 1 and event information corresponding to cell 1 to a base station that controls a cell where the RRC connection is re-established. Alternatively, the terminal may carry the cell identity of cell 1 and the event information corresponding to cell 1 into an RLF report and report the RLF report to the base station that controls the cell where the RRC connection is re-established. The cell where the RRC connection is re-established may or may not be the source cell. This embodiment uses the following scenario as an example for description: The cell where the RRC connection is re-established is not the source cell, and the cell where the RRC connection is re-established and the source cell belong to different base stations.

The scenario of this embodiment is that only after the time when the signal quality of cell 1 meets the preset signal quality threshold exceeds the TTT length, that is, the event information corresponding to cell 1 has been updated to TTT timeout, the RLF occurs in the source cell of the terminal. Therefore, in S304 of this embodiment, the event information of cell 1 that is reported by the terminal to the base station that controls the cell where the RRC connection is re-established is TTT timeout.

It should be noted that if, when the signal quality of cell 1 does not meet the preset signal quality threshold, the RLF occurs in the source cell of the terminal, that is, in a case where S304 is directly executed after S301, the event information corresponding to cell 1 is still initial status information. In this case, in S304, the event information of cell 1 that is reported by the terminal to the base station that controls the cell where the RRC connection is re-established is initial status information.

If the signal quality of cell 1 meets the set threshold, but TTT timeout does not occur, the RLF is generated on the source base station of the terminal (S304 is executed after S302), and the event information corresponding to cell 1 is an identity that indicates meeting a signal quality threshold. In this case, in step 304, the event information of cell 1 that is reported by the terminal to the base station that controls the cell where the RRC connection is re-established is meeting a signal quality threshold.

Further, the terminal may further report one or more of the following information delivered by the source base station to the base station that controls the cell where the RRC connection is re-established: T310 (that is specifically a timer that determines whether an RLF occurs), N310 (a number of times for reporting Qout, where Qout is a signal quality threshold that determines whether out-of-synchronization occurs), the maximum attempts for radio link control (RLC) retransmission, the maximum attempts for random access channel (RACH) preamble retransmission, and the like, so as to help the source base station to adjust the mobility parameter of the neighboring cell.

S305. The base station that controls the cell where the RRC connection is re-established forwards the cell identity of cell 1 that is reported by the terminal and the event information corresponding to cell 1 to the source base station.

S306. The source base station adjusts a mobility parameter of cell 1 according to the event information corresponding to cell 1.

For a method for adjusting the mobility parameter of cell 1 in S306, reference may be made to the detailed content in the embodiment shown in FIG. 2. No further details are provided herein.

According to the technical solution provided in this embodiment, when an RLF occurs on a terminal, the terminal re-establishes an RRC connection and sends, to a base station that controls a cell where the RRC connection is re-established, a cell identity of a neighboring cell of a source cell and event information of the neighboring cell that is recorded by the terminal before the RLF occurs. This enables the base station that controls the cell where the RRC connection is re-established to forward, to a source base station, the cell identity of the neighboring cell of the source cell and the event information of the neighboring cell that is recorded by the terminal before the RLF occurs. Then, the source base station may adjust a mobility parameter of the neighboring cell according to an event undergone by the neighboring cell and send the adjusted mobility parameter to the terminal. This further improves the accuracy of mobility parameter adjustment and the terminal handover efficiency. It should be noted that if the cell where the RRC connection is re-established and the source cell belong to a same base station, the source base station may directly obtain the cell identity of the neighboring cell of the source cell and the event information of the neighboring cell that is recorded by the terminal before the connection failure occurs, and adjust the mobility parameter of the neighboring cell.

Figure 4:
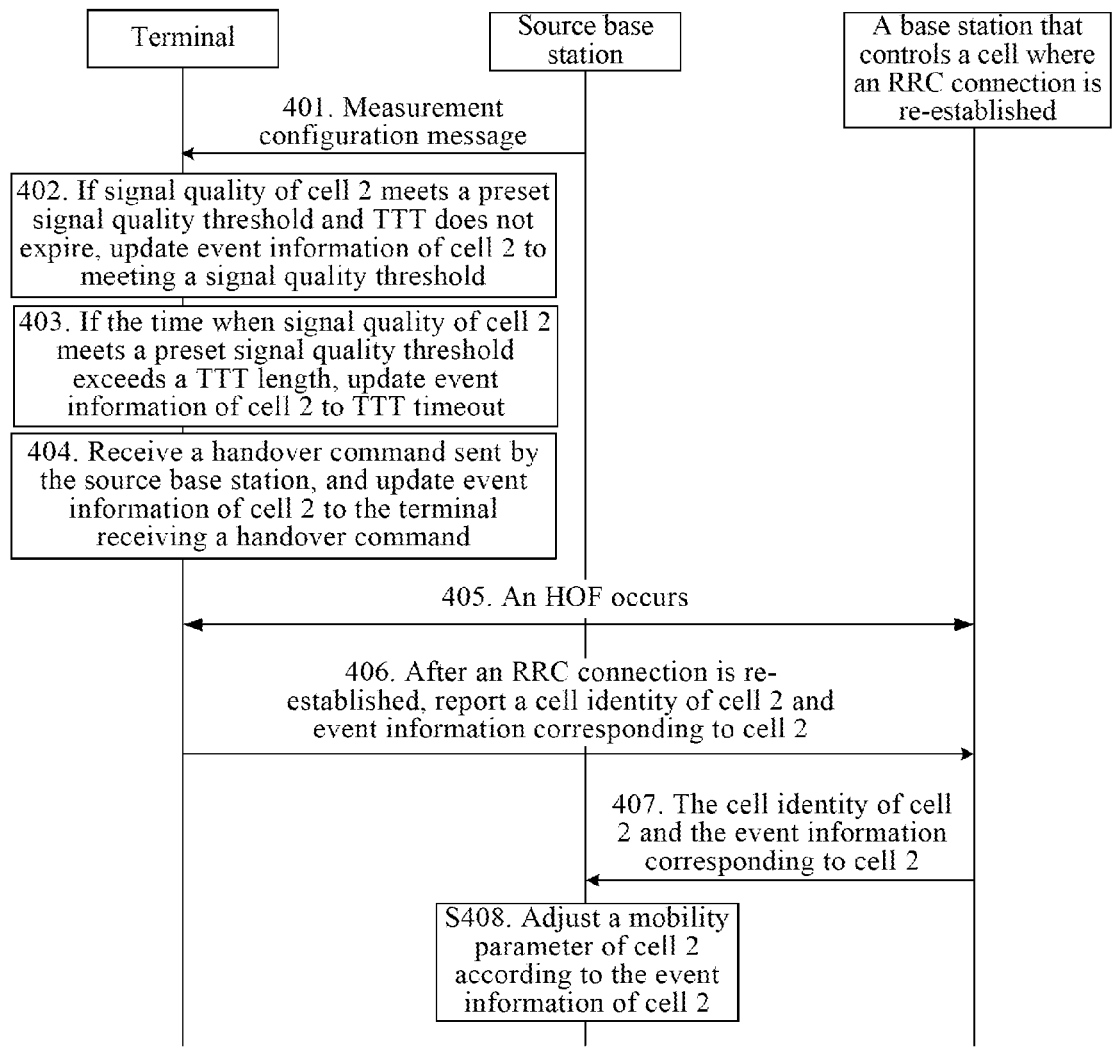
FIG. 4 is a schematic flowchart of a method according to still another embodiment of the present invention.

FIG. 4 is a flowchart of a method for adjusting a cell mobility parameter according to still another embodiment of the present invention. As shown in FIG. 4, this embodiment differs from the preceding embodiment in that an HOF occurs after a terminal receives a handover command. The method specifically includes the following content:

S401. The terminal receives measurement configuration information sent by a source base station and measures a source cell (that is, a current serving cell) and a neighboring cell according to the measurement configuration information.

S402. If the measured signal quality of cell 2 meets a preset signal quality threshold (in this embodiment, the threshold is set to an A3 threshold), the terminal enables TTT and, when the TTT does not expire, updates event information corresponding to a cell identity of cell 2 from initial status information to meeting a signal quality threshold.

S403. If the TTT set for cell 2 expires, that is, signal quality of cell 2 meets the preset signal quality threshold within the TTT, the terminal updates the event information corresponding to the cell identity of cell 2 to TTT timeout, and terminal reports a measurement report to the source base station.

The process from S401 to S403 is similar to that from S301 to S303 in the embodiment shown in FIG. 3. For details, reference may be made to the embodiment shown in FIG. 3.

S404. The terminal receives the handover command (for example, HO Command) sent by the source base station, and the terminal updates the event information corresponding to cell 2 from TTT timeout to the terminal receiving a handover command.

After receiving the handover command, the terminal disconnects from the source base station and starts to establish a connection to a handover target base station.

S405. The HOF occurs on the terminal, that is, a handover to the handover target base station fails.

S406. The terminal re-establishes an RRC connection, carries the cell identity of cell 2 and the event information corresponding to cell 2 into an RLF report, and reports the RLF report to a base station that controls RRC connection re-establishment. The event information corresponding to cell 2 is the terminal receiving a handover command.

In this embodiment, the base station that controls RRC connection re-establishment may be the source base station, may also be the handover target base station where a handover failure occurs, and may still be a third base station other than the source base station and the handover target base station. This embodiment uses the following scenario as an example for description: The base station that controls RRC connection re-establishment is the handover target base station or a third base station, and the base station that controls RRC connection re-establishment and the source base station are different base stations.

Further, the terminal may further report one or more of the following information delivered by the source base station to the base station that controls RRC connection re-establishment: T310, N310, N311, the maximum attempts for RLC retransmission, the maximum attempts for random access preamble retransmission, and the like, so as to help the source base station to adjust a mobility parameter of the neighboring cell.

S407. The base station that controls RRC connection re-establishment forwards a cell identity of cell 1 that is reported by the terminal and event information corresponding to cell 1 to the source base station of the terminal.

S408. The source base station adjusts a mobility parameter of cell 2 according to the event information corresponding to cell 2.

For a method for adjusting the mobility parameter of cell 2 in S408, reference may be made to the detailed content in the embodiment shown in FIG. 2. No further details are provided herein.

Alternatively, after receiving the handover command sent by the source base station, the terminal may also initiate random access or non-random access to the handover target base station.

In a process for initiating random access (RACH), by the terminal, to the handover target base station, alternatively, after sending a preamble message to the handover target base station, the terminal may update the event information corresponding to cell 2 to the terminal sending an preamble; after receiving a preamble response message sent by the handover target base station, the terminal may update the event information corresponding to cell 2 to the terminal acquiring a preamble response; after sending a first uplink scheduling message to the handover target base station, the terminal may update the event information corresponding to cell 2 to the terminal sending a scheduling message by; and after receiving information that instructs how to resolve a collision and is returned by the handover target base station, the terminal may update the event information corresponding to cell 2 to the terminal receiving information that instructs how to resolve a collision by.

As a feasible implementation manner, the event information of cell 2 may be represented in the form of an identity, for example, the terminal sending a preamble may be represented by "4", the terminal acquiring a preamble response may be represented by "5", the terminal sending a scheduling message may be represented by "6", and the terminal receiving information that instructs how to resolve a collision may be represented by "7".

In a process for initiating non-random access, by the terminal, to the handover target base station, after receiving configured preamble information delivered by the handover target base station, the terminal updates the event information corresponding to cell 2 to the terminal receiving configured preamble information; if the terminal sends a preamble to the handover target base station, the terminal updates the event information corresponding to cell 2 to the terminal sending a preamble; and if the terminal receives a preamble response message returned by the handover target base station, the terminal updates the event information corresponding to cell 2 to the terminal acquiring a preamble response.

Accordingly, if the event information of cell 2 reported by the terminal is the terminal sending a preamble, the terminal acquiring a preamble response, the terminal sending a scheduling message, the terminal receiving information that instructs how to resolve a collision, or the terminal receiving configured preamble information, the source base station may adjust uplink power of cell 2.

According to the technical solution provided in this embodiment, when an HOF occurs on a terminal, the terminal re-establishes an RRC connection and sends, to a base station that controls a cell where the RRC connection is re-established, a cell identity of a neighboring cell of a source cell and event information of the neighboring cell that is recorded by the terminal before the HOF occurs. This enables the base station that controls the cell where the RRC connection is re-established to forward, to a source base station, the cell identity of the neighboring cell of the source cell and the event information of the neighboring cell that is recorded by the terminal before the HOF occurs. Then, the source base station may adjust a mobility parameter of the neighboring cell according to an event undergone by the neighboring cell and send the adjusted mobility parameter to the terminal. This further improves the accuracy of mobility parameter adjustment and the terminal handover efficiency.

It should be noted that if the cell where the RRC connection is re-established and the source cell belong to a same base station, the source base station may directly obtain the cell identity of the neighboring cell of the source cell and the event information of the neighboring cell that is recorded by the terminal before the connection failure occurs, and adjust the mobility parameter of the neighboring cell.

Persons of ordinary skill in the art should understand that all or a part of the procedures in methods of the preceding embodiments may be implemented by a program instructing related hardware. The program may be stored in a computer readable storage medium. When the program is executed, the procedures in the preceding method embodiments may be included. The storage medium may be a magnetic disk, an optical disc, a read-only memory (ROM), a random access memory (RAM), or the like.

Figure 5:
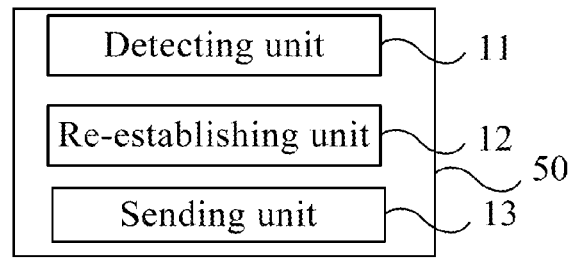
FIG. 5 is a schematic structural diagram of a terminal according to an embodiment of the present invention.

FIG. 5 is a schematic structural diagram of a terminal according to an embodiment of the present invention. As shown in FIG. 5, a terminal 50 includes a detecting unit 11, a re-establishing unit 12, and a sending unit 13.

The detecting unit 11 is configured to detect a connection failure that occurs on the terminal; the re-establishing unit 12 is configured to, when the detecting unit detects that a connection failure occurs on the terminal, re-establish a radio resource control RRC connection; and the sending unit 13 is configured to send, to a base station that controls a cell where the RRC connection is re-established, a cell identity of a neighboring cell of a source cell and event information of the neighboring cell that is recorded by the terminal before the connection failure occurs.

Alternatively, the event information of the neighboring cell sent by the sending unit 13 includes one of the following information: initial status information, meeting a signal quality threshold, time to trigger TTT timeout, and the terminal receiving a handover command.

If the connection failure detected by the detecting unit 11 is an RLF that occurs in the source cell of the terminal, one of the following may be chosen. If, before the RLF occurs on the terminal, signal quality of the neighboring cell does not meet a preset signal quality threshold, the event information of the neighboring cell sent by the sending unit 13 is initial status information. Alternatively, if, before the RLF occurs on the terminal, signal quality of the neighboring cell meets a preset signal quality threshold and time to trigger TTT does not expire, the event information of the neighboring cell sent by the sending unit 13 is meeting a signal quality threshold. Alternatively, if, before the RLF occurs on the terminal, the time when signal quality of the neighboring cell meets a preset signal quality threshold exceeds a preset TTT length, the event information of the neighboring cell sent by the sending unit 13 is TTT timeout.

If the connection failure detected by the detecting unit 11 is an HOF that occurs on the terminal, one of the following may be performed. If, the terminal has received a handover command sent by a base station that controls the source cell, the event information of the neighboring cell sent by the sending unit 13 is the terminal receiving a handover command. Alternatively, if, when the detecting unit 11 detects that the HOF occurs on the terminal, the terminal has sent a preamble message to a base station that controls a handover target cell, the event information of the neighboring cell sent by the sending unit 13 is the terminal sending a preamble. Alternatively, if, when the detecting unit detects that the HOF occurs on the terminal, the terminal has received a preamble response message returned by the base station that controls the handover target cell, the event information of the neighboring cell sent by the sending unit 13 is the terminal acquiring a preamble response. Alternatively, if, when the detecting unit 11 detects that the HOF occurs on the terminal, the terminal has sent a first uplink scheduling message to the base station that controls the handover target cell, the event information of the neighboring cell sent by the sending unit 13 is the terminal sending a scheduling message. Alternatively, if, when the detecting unit 11 detects that the HOF occurs on the terminal, the terminal has received information that instructs how to resolve a collision and is returned by the base station that controls the handover target cell, the event information of the neighboring cell sent by the sending unit 13 is the terminal receiving information that instructs how to resolve a collision. Alternatively, if, when the detecting unit detects that the HOF occurs on the terminal, the terminal has received configured preamble information delivered by the base station that controls the handover target cell, the event information of the neighboring cell sent by the sending unit 13 is the terminal receiving configured preamble information.

Alternatively, the sending unit 13 is further configured to send one or more of the following parameters delivered by the base station that controls the source cell to the base station that controls the target cell: a timer, which is configured to determine whether an RLF occurs; a number of times, which is configured to determine whether to enable out-of-synchronization indication of the timer; a number of times, which is configured to determine whether to disable synchronization indication of the timer; the maximum retransmission attempts at a radio link control layer; and the maximum preamble retransmission attempts.

The terminal according to this embodiment may implement the content that is operated by the terminal in the method embodiments shown in FIG. 1-FIG. 4. No further details are provided herein.

According to this embodiment of the present invention, to re-establish an RRC connection when a connection failure occurs, the terminal sends, to a base station that controls a cell where the RRC connection is re-established, a cell identity of a neighboring cell of a source cell and event information of the neighboring cell that is recorded by the terminal before the connection failure occurs. This enables the base station that controls the cell where the RRC connection is re-established to forward, to a source base station, the cell identity of the neighboring cell of the source cell and the event information of the neighboring cell that is recorded by the terminal before the connection failure occurs. Then, the source base station may adjust a mobility parameter of the neighboring cell according to an event undergone by the neighboring cell and send the adjusted mobility parameter to the terminal. This further improves the accuracy of mobility parameter adjustment and the terminal handover efficiency. It should be noted that if the cell where the RRC connection is re-established and the source cell belong to a same base station, the source base station may directly obtain the cell identity of the neighboring cell of the source cell and the event information of the neighboring cell that is recorded by the terminal before the connection failure occurs, and adjust the mobility parameter of the neighboring cell.

Figure 6:
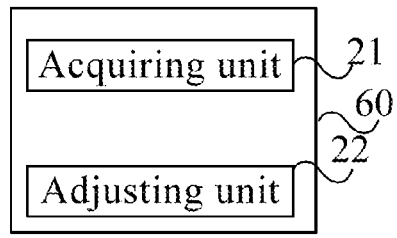
FIG. 6 is a schematic structural diagram of a base station according to an embodiment of the present invention.

FIG. 6 is a schematic structural diagram of a base station according to an embodiment of the present invention. As shown in FIG. 6, the base station includes an acquiring unit 21 and an adjusting unit 22.

The acquiring unit 21 is configured to acquire a cell identity of a neighboring cell of a source cell that is reported by a terminal after a connection failure occurs and event information of the neighboring cell that is recorded by the terminal before the connection failure occurs. The adjusting unit 22 is configured to adjust a mobility parameter of the neighboring cell according to the event information of the neighboring cell that is acquired by the acquiring unit 21 and recorded by the terminal before the connection failure occurs.

Alternatively, if the source cell and a cell where the terminal re-establishes an RRC connection after the connection failure occurs are a same base station, the acquiring unit is further configured to, after the terminal re-establishes the RRC connection, receive the cell identity of the neighboring cell of the source cell that is reported by the terminal and the event information of the neighboring cell that is recorded by the terminal before the connection failure occurs.

If the source cell and the cell where the terminal re-establishes the RRC connection after the connection failure occurs belong to different base stations, the acquiring unit is further configured to, after the terminal re-establishes the RRC connection, receive the cell identity of the neighboring cell of the source cell that is forwarded by a base station that controls the cell where the RRC connection is re-established and the event information of the neighboring cell that is recorded by the terminal before the connection failure occurs.

Alternatively, the event information of the neighboring cell acquired by the acquiring unit includes one of the following information: initial status information, meeting a signal quality threshold, time to trigger TTT timeout, and the terminal receiving a handover command.

As a specific embodiment, the adjusting unit 22 may specifically be configured to: if the number of times that the event information of the neighboring cell is initial status information exceeds a preset threshold, decrease a signal quality threshold in mobility parameters of the neighboring cell; and if the number of times that the event information of the neighboring cell is meeting a signal quality threshold exceeds a preset threshold, decrease a TTT length in mobility parameters of the neighboring cell.

The base station according to this embodiment of the present invention is a source base station of the terminal, and corresponding to the method for adjusting a cell mobility parameter according to the embodiment shown in FIG. 2, is a device for executing the method embodiment. For a specific execution process thereof, reference may be made to the method embodiment, and no further details are provided herein.

According to the technical solution provided in this embodiment, a source base station acquires a cell identity of a neighboring cell that is reported by a terminal after a connection failure occurs and event information of the neighboring cell that is recorded by the terminal before the connection failure occurs, so that a base station that controls the source cell may adjust a mobility parameter of the neighboring cell according to the event information of the neighboring cell and send the adjusted mobility parameter to the terminal, thereby improving the accuracy of mobility parameter adjustment and the terminal handover efficiency.

Figure 7:
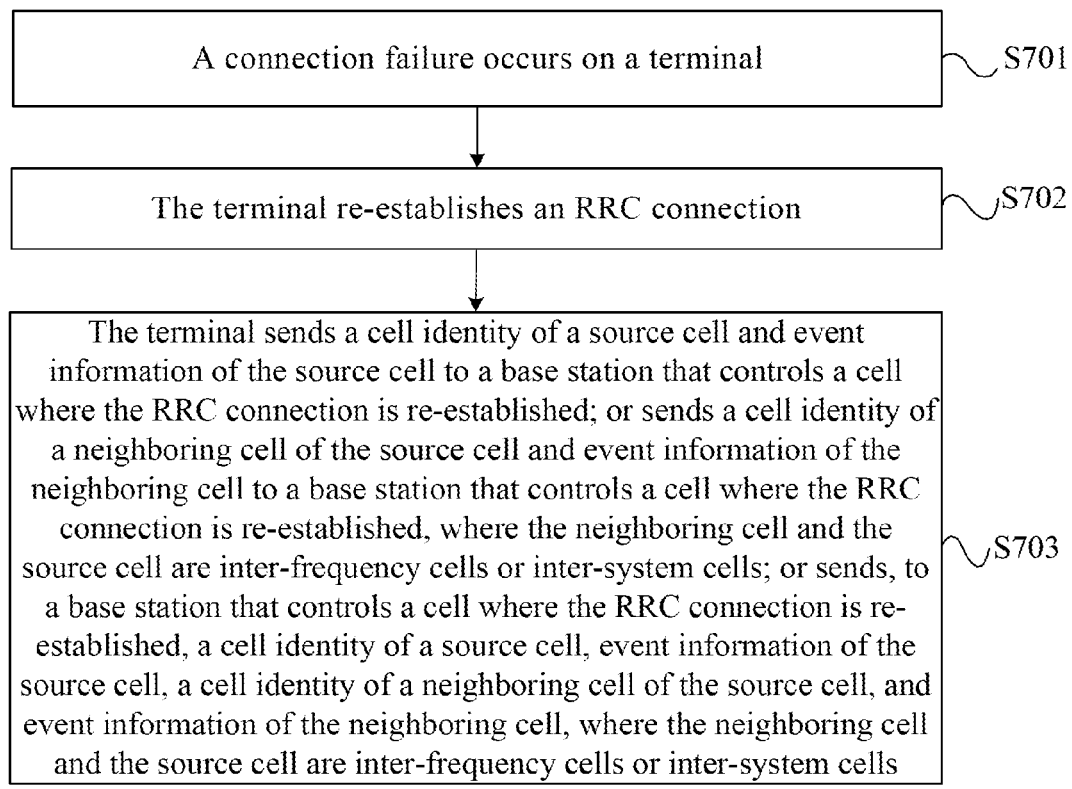
FIG. 7 is a flowchart of a method for reporting cell information according to an embodiment of the present invention.

FIG. 7 is a flowchart of a method for reporting cell information according to an embodiment of the present invention. As shown in FIG. 1, the method includes the following content:

S701. A connection failure occurs on a terminal.

Alternatively, the connection failure that occurs on the terminal may be an RLF that occurs in a source cell of the terminal and may also be an HOF that occurs on the terminal.

In each embodiment of the present invention, a terminal may be a UE, for example, a radio communications device, a handheld device, or a cordless phone.

S702. The terminal re-establishes an RRC connection.

In this embodiment, the terminal may re-establish the RRC connection in a source cell, may also re-establish the RRC connection in a handover target cell, and may still re-establish the RRC connection in a third cell other than the source cell and the handover target cell.

S703. The terminal sends, to a base station that controls a cell where the RRC connection is re-established, a cell identity of the source cell and event information of the source cell that is recorded by the terminal before the connection failure occurs.

The terminal sends, to the base station that controls the cell where the RRC connection is re-established, a cell identity of a neighboring cell of the source cell and event information of the neighboring cell that is recorded by the terminal before the connection failure occurs, where the neighboring cell and the source cell are inter-frequency cells or inter-system cells. Alternatively, the terminal sends, to the base station that controls the cell where the RRC connection is re-established, a cell identity of a source cell, the event information of the source cell that is recorded by the terminal before the connection failure occurs, a cell identity of a neighboring cell of the source cell, and event information of the neighboring cell that is recorded by the terminal before the connection failure occurs. The neighboring cell and the source cell are inter-frequency cells or inter-system cells.

The cell where the RRC connection is re-established may be the handover target cell where a handover failure occurs, or the source cell, or the third cell other than the source cell and the handover target cell.

For ease of description, in the following embodiments, the "event information of the source cell recorded by the terminal before the connection failure occurs" may also be called the "event information of the source cell", and the event information of the neighboring cell that is at a frequency or in a communications system different from the source cell, where the event information of the neighboring cell is recorded by the terminal before the connection failure occurs, may also be called the "event information of the neighboring cell". A base station that controls the source cell may also be called a source base station, a base station that controls the handover target cell may also be called a handover target base station, and a base station that controls a third cell may also be called a third base station.

Alternatively, the event information of the source cell may include: initial status information, meeting a signal quality threshold, or TTT timeout.

As an alternative embodiment, if the connection failure that occurs on the terminal is an RLF, one of the following may be chosen. If, before the RLF occurs on the terminal, signal quality of the source cell does not meet a preset signal quality threshold, the event information of the source cell is initial status information. Alternatively, if, before the RLF occurs on the terminal, signal quality of the source cell meets a preset signal quality threshold, the event information of the source cell is meeting a signal quality threshold. Alternatively, if, before the RLF occurs on the terminal, the time when signal quality of the source cell meets a preset signal quality threshold exceeds a preset TTT length, the event information of the source cell is TTT timeout.

The event information of the neighboring cell that is at a frequency or in a communications system different from the source cell includes one of the following information: initial status information, meeting a signal quality threshold, TTT timeout, and the terminal receiving a handover command.

As an alternative embodiment if, before the RLF occurs on the terminal, signal quality of the neighboring cell does not meet a preset signal quality threshold, the event information of the neighboring cell is initial status information. Alternatively, if, before the RLF occurs on the terminal, signal quality of the neighboring cell meets a preset signal quality threshold, but TTT does not expire, the event information of the neighboring cell is meeting a signal quality threshold. Alternatively, if, before the RLF occurs on the terminal, the time when signal quality of the neighboring cell meets a preset signal quality threshold exceeds a preset TTT length, the event information of the neighboring cell is TTT timeout. As another alternative embodiment, if the connection failure that occurs on the terminal is an HOF and the terminal has received, before the HOF occurs on the terminal, a handover command sent by the source base station, the event information of the neighboring cell that is at a frequency or in a communications system different from the source cell is the terminal receiving a handover command. Alternatively, if, when the HOF occurs on the terminal, the terminal has sent a preamble message to the handover target base station, the event information of the neighboring cell is the terminal sending a preamble. Alternatively, if, when the HOF occurs on the terminal, the terminal has received a preamble response message returned by the handover target base station, the event information of the neighboring cell is the terminal acquiring a preamble response. Alternatively, if, when the HOF occurs on the terminal, the terminal has sent a first uplink scheduling message to the handover target base station, the event information of the neighboring cell is the terminal sending a scheduling message. Alternatively, if, when the HOF occurs on the terminal, the terminal has received information that instructs how to resolve a collision and is returned by the handover target base station, the event information of the neighboring cell is the terminal receiving information that instructs how to resolve a collision. Alternatively, if, when the HOF occurs on the terminal, the terminal has received configured preamble information delivered by the handover target base station, the event information of the neighboring cell is the terminal receiving configured preamble information.

In each of the preceding embodiments, there may be one or more neighboring cells that are at a frequency or in a communications system different from the source cell. For example, if cell A is a source cell, cell A may have one or more inter-frequency or inter-system neighboring cells, including cell B, cell C, cell D, and cell E. Cell B, cell C, cell D, and cell E are at a frequency or in a communications system different from cell A; that is, they are inter-frequency or inter-system cells of cell A. The following uses cell B, cell C, cell D, and cell E as neighboring cells of cell A for description.

The event information of the source cell recorded by the terminal before the connection failure occurs may be TTT timeout, and event information of each of the preceding neighboring cells of the source cell may separately be meeting a signal quality threshold, initial status, the terminal receiving a handover command, and TTT timeout. As an alternative embodiment, in S703, the terminal may send Table 2 to a target base station.

TABLE 2

| Cell identity | Event information |
|---|---|
| Cell A | TTT timeout |
| Cell B | Meeting a signal quality threshold |
| Cell C | Initial status information |
| Cell D | The terminal receiving a handover command |
| Cell E | TTT timeout |

It can be seen from Table 2 that before the RLF occurs, the event information of cell A (the source cell) recorded by the terminal is TTT timeout, the recorded event information corresponding to cell B is meeting a signal quality threshold, the recorded event information corresponding to cell C is initial status information, and the recorded event information of cell D is the terminal receiving a handover command, and the recorded event information of cell E is TTT timeout. The following describes, by using Table 2 as an example, a process for recording, by the terminal, the event information of the neighboring cell.

Firstly, the terminal sets event information of the source cell and the neighboring cell to initial status information, where the initial status information may also be called initial status of the event information of the source cell and the neighboring cell. For example, the terminal sets all event information of 1 source cell and 4 neighboring cells in Table 2 to initial status information.

For cell C: If no events occur in cell C before the RLF occurs on the terminal, that is, a signal quality threshold of cell C does not meet a preset signal quality threshold, event information of cell C that is sent by the terminal to the target base station after the RLF occurs is the initial status information, for example, the event information corresponding to cell C in Table 2.

For cell B: If, before the RLF occurs on the terminal, the measured cell A meets a signal quality threshold, that is, event information of cell A is meeting a signal quality threshold, where the signal quality threshold may be an A2 threshold; and cell B meets a signal quality threshold, where the signal quality threshold may be an A4 threshold in an implementation scenario where cell B and cell A are at different frequencies and may be a B1 threshold in an implementation scenario where cell B and cell A are in different communications system, the terminal may update event information corresponding to cell B from initial status information to meeting a signal quality threshold. The event information of cell B that is sent by the terminal to the target base station after the RLF occurs is meeting a signal quality threshold, for example, the event information corresponding to cell B in Table 1.

For the source cell, that is, cell A: If, before the RLF occurs on the terminal, the measured signal quality of cell A meets a preset signal quality threshold, where the signal quality threshold may be an A2 threshold, the terminal may update event information corresponding to cell A from initial status information to meeting a signal quality threshold; and if, before the RLF occurs on the terminal, the time when signal quality of cell A meets the preset signal quality threshold exceeds a preset TTT length, the terminal may update the event information corresponding to cell A from meeting a signal quality threshold to TTT timeout. The event information of cell A that is sent by the terminal to the target base station after the RLF occurs is TTT timeout, for example, the event information corresponding to cell A in Table 2.

For cell D: If, before the RLF occurs on the terminal, the measured signal quality of cell D meets a preset signal quality threshold, the terminal updates event information corresponding to cell D from initial status information to meeting the signal quality threshold; and if the terminal has received, before the HOF occurs, the handover command sent by the source base station, the terminal then updates the event information corresponding to cell D from meeting a signal quality threshold to the terminal receiving a handover command. The event information of cell D that is sent by the terminal to the target base station after the HOF occurs on the terminal is the terminal receiving a handover command, for example, the event information corresponding to cell D in Table 2.

For cell E: If, before the RLF occurs on the terminal, the measured signal quality of cell E has met a preset signal quality threshold, the terminal updates event information corresponding to cell E from initial status information to meeting a signal quality threshold; and if the time when the measure signal quality of cell E has met the preset signal quality threshold exceeds the preset TTT length, the terminal updates the event information corresponding to cell E from meeting a signal quality threshold to TTT length. The event information of cell E that is sent by the terminal to the target base station after the RLF occurs is TTT length, for example, the event information corresponding to cell E in Table 2.

It can be seen from the process for recording, by the terminal, event information that when a new event occurs, the terminal replaces original event information with new event information. Therefore, after the RLF or HOF occurs, the event information of the source cell reported by the terminal to the target base station indicates an event that recently occurs in and relates to the source cell, and the event information of the neighboring cell reported by the terminal to the target base station indicates an event that recently occurs in and relates to the neighboring cell.

Alternatively, the cell identity may be a physical ID of a cell, may also be a CGI, and may still be a physical ID and a CGI. The event information may be represented by an event identity. For example, it may be represented by a numeral, a letter, a character string, or any combination thereof. Each event has a unique event identity. For example, an initial status is represented by "0", meeting a signal quality threshold is represented by "1", TTT timeout is represented by "2", and the terminal receiving a handover command is represented by "3"; or an initial status is represented by "00", meeting a signal quality threshold is represented by "01", and the terminal receiving a handover command is represented by "10".

Alternatively, as another alternative embodiment, the terminal may further send one or more of the following parameters delivered by the source base station to the target base station: a timer T310, which is configured to determine whether an RLF occurs; a number of times N310, which is configured to determine whether to enable out-of-synchronization indication of the timer; a number of times N311, which is configured to determine whether to disable synchronization indication of the timer; the maximum retransmission attempts at a radio link control layer; and the maximum preamble retransmission attempts.

In each embodiment of the present invention, a source base station and a target base station may be evolved base stations eNBs, BSs, NodeBs, APs, or the like. A source base station and a target base station may be macro base stations, may also be medium-sized base stations, and may still be micro base stations, for example, home base stations.

According to the technical solution provided in this embodiment, when a connection failure occurs on a terminal, the terminal re-establishes an RRC connection and sends, to a base station that controls a cell where the RRC connection is re-established, a cell identity of a source cell and event information of the source cell that is recorded by the terminal before the connection failure occurs; or sends, to a base station that controls a cell where the RRC connection is re-established, a cell identity of a neighboring cell that is at a frequency or in a communications system different from the source cell and event information of the neighboring cell; or sends, to the base station that controls the cell where the RRC connection is re-established, a cell identity of a source cell, event information of the source cell, and a cell identity of the neighboring cell and event information of the neighboring cell so that the base station that controls the cell where the RRC connection is re-established forwards the preceding information reported by the terminal to a source base station, and then, the source base station may adjust a mobility parameter according to an event undergone by the source cell and/or an event undergone by the neighboring cell that is at a frequency or in a system different from the source cell, thereby improving the accuracy of mobility parameter adjustment and the terminal handover efficiency.

Figure 8:
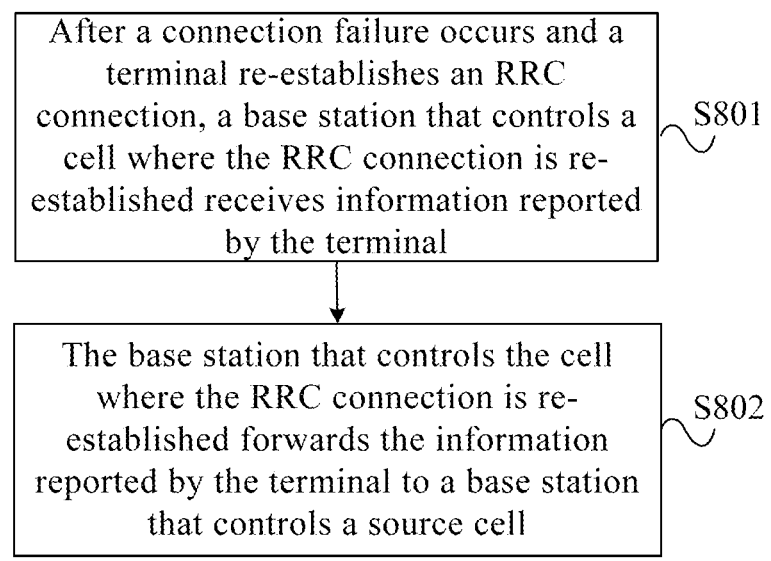
FIG. 8 is a flowchart of a method for adjusting a cell mobility parameter according to an embodiment of the present invention.

FIG. 8 is a flowchart of a method for adjusting a cell mobility parameter according to an embodiment of the present invention. As shown in FIG. 8, the method includes the following content:

S801. After a connection failure occurs and a terminal re-establishes an RRC connection, a base station that controls a cell where the RRC connection is re-established receives information reported by the terminal.

The information reported by the terminal includes a cell identity of the source cell and event information of the source cell that is recorded by the terminal before the connection failure occurs; or includes a cell identity of a neighboring cell of the source cell and event information of the neighboring cell that is recorded by the terminal before the connection failure occurs; or includes a cell identity of the source cell, event information of the source cell that is recorded by the terminal before the connection failure occurs, a cell identity of the neighboring cell of the source cell, and event information of the neighboring cell that is recorded by the terminal before the connection failure occurs, where the neighboring cell and the source cell are inter-frequency cells or inter-system cells.

In S801, the cell identity of the source cell and the event information of the source cell that is recorded by the terminal before the connection failure occurs are reported by the terminal to the base station that controls the cell where the RRC connection is re-established, and the cell identity of the neighboring cell of the source cell and the event information of the neighboring cell that is recorded by the terminal before the connection failure occurs are reported by the terminal to the base station that controls the cell where the RRC connection is re-established.

Alternatively, the event information of the source cell received by the base station that controls the cell where the RRC connection is re-established may include initial status information, meeting a signal quality threshold, or time to trigger TTT timeout.

As a feasible implementation manner, the connection failure that occurs on the terminal is a radio link failure RLF that occurs in the source cell of the terminal, if, before the RLF occurs on the terminal, signal quality of the source cell does not meet a preset signal quality threshold, the event information of the source cell in the information reported by the terminal is initial status information. Alternatively, if, before the RLF occurs on the terminal, signal quality of the source cell meets a preset signal quality threshold, the event information of the source cell in the information reported by the terminal is meeting a signal quality threshold. Alternatively, if, before the RLF occurs on the terminal, the time when signal quality of the source cell meets a preset signal quality threshold exceeds a preset time to trigger TTT length, the event information of the source cell in the information reported by the terminal is TTT timeout.

Alternatively, the event information of the neighboring cell received by the base station that controls the cell where the RRC connection is re-established may include one of the following information: initial status information, meeting a signal quality threshold, time to trigger TTT timeout, or the terminal receiving a handover command.

As a feasible implementation manner, the connection failure that occurs on the terminal is a radio link failure RLF that occurs in the source cell of the terminal, if, before the RLF occurs on the terminal, signal quality of the neighboring cell does not meet a preset signal quality threshold, the event information of the neighboring cell in the information reported by the terminal is initial status information. Alternatively, if, before the RLF occurs on the terminal, signal quality of the neighboring cell meets a preset signal quality threshold, the event information of the neighboring cell in the information reported by the terminal is meeting a signal quality threshold. Alternatively, if, before the RLF occurs on the terminal, the time when signal quality of the neighboring cell meets a preset signal quality threshold exceeds a preset time to trigger TTT length, the event information of the neighboring cell in the information reported by the terminal is TTT timeout.

As another feasible implementation manner, the connection failure that occurs on the terminal is a handover failure HOF that occurs on the terminal, if, when the HOF occurs on the terminal, the terminal has received a handover command sent by a base station that controls the source cell, the event information of the neighboring cell in the information reported by the terminal is the terminal receiving a handover command. Alternatively, if, when the HOF occurs on the terminal, the terminal has sent a preamble message to a base station that controls a handover target cell, the event information of the neighboring cell in the information reported by the terminal is the terminal sending a preamble. Alternatively, if, when the HOF occurs on the terminal, the terminal has received a preamble response message returned by a base station that controls a handover target cell, the event information of the neighboring cell in the information reported by the terminal is the terminal acquiring a preamble response. Alternatively, if, when the HOF occurs on the terminal, the terminal has sent a first uplink scheduling message to a base station that controls a handover target cell, the event information of the neighboring cell in the information reported by the terminal is the terminal sending a scheduling message. Alternatively, if, when the HOF occurs on the terminal, the terminal has received information that instructs how to resolve a collision and is returned by a base station that controls a handover target cell, the event information of the neighboring cell in the information reported by the terminal is the terminal receiving information that instructs how to resolve a collision. Alternatively, if, when the HOF occurs on the terminal, the terminal has received configured preamble information delivered by a base station that controls a handover target cell, the event information of the neighboring cell in the information reported by the terminal is the terminal receiving configured preamble information.

S802. The base station that controls the cell where the RRC connection is re-established forwards the information reported by the terminal to the base station that controls the source cell.

After receiving the information reported by the terminal, the base station that controls the cell where the RRC connection is re-established may forward the information reported by the terminal to the base station that controls the source cell, so that the base station that controls the source cell may adjust a mobility parameter according to information, which is reported by the terminal, about an event undergone by the source cell and/or an event undergone by the neighboring cell that is at a frequency or in a system different from the source cell thereby improving the accuracy of mobility parameter adjustment and the terminal handover efficiency.

According to the technical solution provided in this embodiment, a base station that controls a cell where an RRC connection is re-established receives the following information reported by a terminal: a cell identity of a source cell and event information of the source cell that is recorded by the terminal before the connection failure occurs; or a cell identity of a neighboring cell that is at a frequency or in a communications system different from the source cell and event information of the neighboring cell; or a cell identity of a source cell and event information of the source cell, and a cell identity of a neighboring cell and event information of the neighboring cell. The base station that controls the cell where the RRC connection is re-established may forward the information reported by the terminal to a base station that controls the source cell. Then, the base station that controls the source cell may adjust a mobility parameter according to an event undergone by the source cell and/or an event undergone by the neighboring cell that is at a frequency or in a system different from the source cell, thereby improving the accuracy of mobility parameter adjustment and the terminal handover efficiency.

The present invention further provides an embodiment for adjusting, by the base station that controls the source cell, a mobility parameter of the source cell and/or that of a neighboring cell that is at a frequency or in a system different from the source cell after receiving the information that is reported by the terminal and forwarded by the base station that controls the cell where the RRC connection is re-established.

For example, if the number of times that the event information of the source cell is initial status information exceeds a preset threshold, the base station that controls the source cell may increase a signal quality threshold in mobility parameters of the source cell.

For example, for the neighboring cell that is at a frequency or in a system different from the source cell, if the number of times that the event information of the source cell is meeting a signal quality threshold exceeds a preset threshold and the number of times that the event information of the neighboring cell is initial status information exceeds a preset threshold, the base station that controls the source cell may decrease a signal quality threshold in mobility parameters of the neighboring cell.

It should be noted that a source base station may receive event information of the source cell that is reported by one or more terminals. Therefore, the source base station may collect statistics about a condition of the event information of the source cell over a period of time that is sent by one or more terminals. For example, if event information of the source cell sent by one terminal over a period of time is initial status information, this indicates that the source cell does not meet a preset signal quality threshold over a period of time, that is, no events occur; or, if more than 90% of event information of the source cell reported by multiple terminals over the period of time is initial status information, the source base station may properly adjust a parameter related to a preset signal quality threshold of the source cell so as to increase the signal quality threshold of the source cell; if most of event information of the source cell reported by multiple terminals over the period of time is meeting a signal quality threshold, and most of the event information of the neighboring cell that is at a frequency or in a communications system different from the source cell, which is reported by multiple terminals over the period of time, is initial status information, and this indicates that a signal quality threshold of the neighboring cell may be set to an excessively high value, and in this case, the source base station may properly adjust a parameter related to a preset signal quality threshold of the neighboring cell so as to decrease the signal quality threshold of the neighboring cell. The preceding is only two specific examples of adjusting, by the source base station, a mobility parameter of the source cell. However, the present invention is not limited to this. It may be understood that the source base station may adjust the mobility parameter of the source cell according to the event information of the source cell, where the event information of the source cell is reported by one or more terminals over the period of time, thereby adjusting the mobility parameter of the source cell in a more accurate manner and improving the terminal handover efficiency.

The preceding is only two specific examples of adjusting, by the source base station, a mobility parameter of the source cell and/or that of the neighboring cell that is at a frequency or in a communications system different from the source cell. However, the present invention is not limited to this.

According to the technical solution provided in this embodiment, a base station that controls a cell where an RRC connection is re-established receives the following information reported by a terminal: a cell identity of a source cell and event information of the source cell that is recorded by the terminal before the connection failure occurs; or a cell identity of a neighboring cell that is at a frequency or in a communications system different from the source cell and event information of the neighboring cell; or a cell identity of a source cell and event information of the source cell, and a cell identity of a neighboring cell and event information of the neighboring cell. The base station that controls the cell where the RRC connection is re-established may forward the information reported by the terminal to a base station that controls the source cell. Then, the base station that controls the source cell may adjust a mobility parameter of the source cell according to an event undergone by the source cell, and may also adjust a mobility parameter of the neighboring cell according to the event undergone by the source cell and that undergone by the neighboring cell that is at a frequency or in a system different from the source cell, thereby improving the accuracy of mobility parameter adjustment and the terminal handover efficiency.

Figure 9:
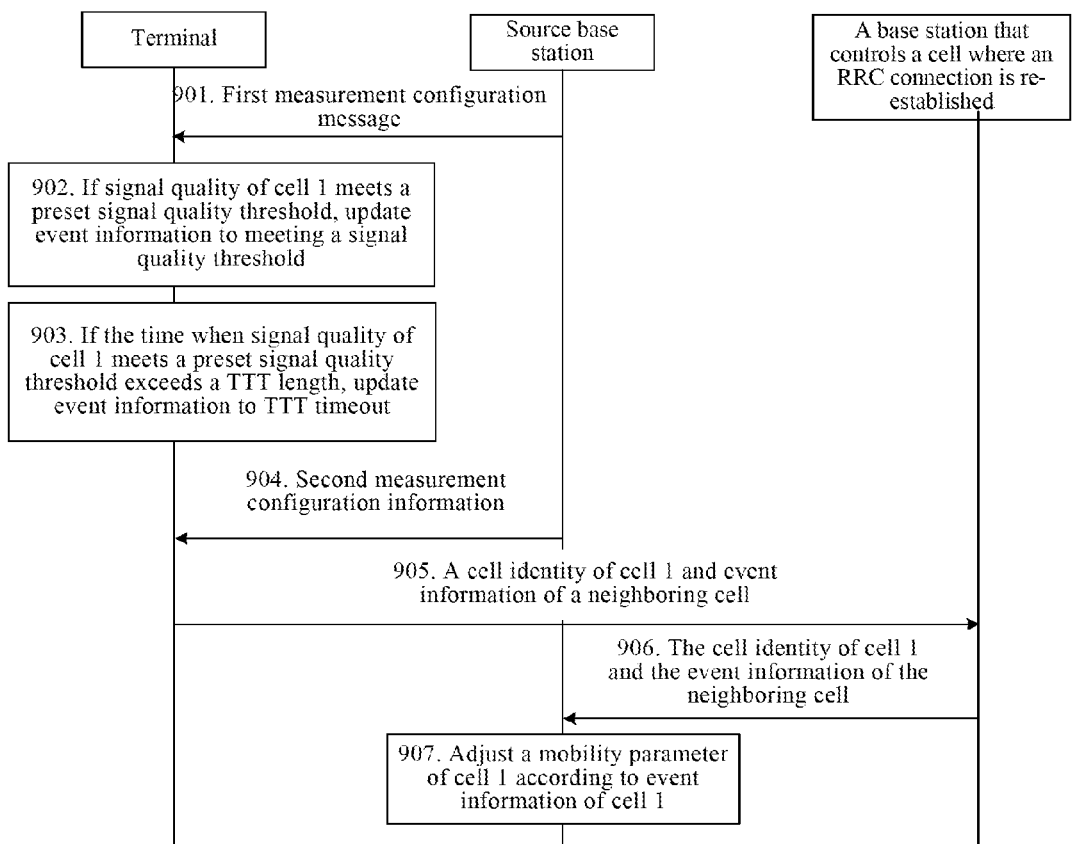
FIG. 9 is a schematic flowchart of a method according to another embodiment of the present invention.

The following is an embodiment shown in FIG. 9. This embodiment further describes in detail the technical solutions in the embodiments shown in FIG. 7 and FIG. 8 by using the following scenario as an example: An RLF occurs between a terminal and a source base station before the terminal receives a handover command sent by the source base station. This embodiment describes, by using cell 1 as a source cell, a specific process where the terminal sends a cell identity of a source cell and event information of the source cell to a base station that controls a cell where an RRC connection is re-established, so that the source base station adjusts a mobility parameter of cell 1 according to event information corresponding to cell 1. This embodiment specifically includes the following content:

S901. The terminal receives first measurement configuration information sent by the source base station and measures the source cell (that is, a current serving cell) and a neighboring cell at a same frequency as the source cell according to the first measurement configuration information.

The terminal receives the first measurement configuration information delivered by the source base station, where the first measurement configuration information instructs the terminal to measure signal quality of the source cell and the intra-frequency neighboring cell, and the first measurement configuration information includes mobility parameters of the source cell and the neighboring cell. The mobility parameters may include a signal quality threshold, for example, an A2 threshold, where the A2 threshold is a signal quality threshold and is specifically an event threshold that is used to report a measurement report and defined in the 3GPP 36.331 standard. Signal quality may be RSRP, RSRQ, or the like. The mobility parameters may further include a TTT length, and if signal quality of the source cell meets a preset signal quality threshold within the TTT length, the terminal reports a measurement report to the source base station.

S902. If the measured signal quality of cell 1 meets a preset signal quality threshold, the terminal updates event information corresponding to a cell identity of cell 1 from initial status information to meeting a signal quality threshold.

The preset signal quality threshold, for example, the A2 threshold, is a preset threshold indicated in the first measurement configuration information delivered by the source base station.

In this embodiment, a default initial value of the event information corresponding to the cell identity of cell 1 is initial status information. When the signal quality of cell 1 meets the preset signal quality threshold, the terminal updates the event information corresponding to the cell identity of cell 1 from initial status information to meeting a signal quality threshold.

S903. If the time when the measured signal quality of cell 1 has met the preset signal quality threshold exceeds a preset TTT length, the terminal updates the event information corresponding to the cell identity of cell 1 from meeting a signal quality threshold to TTT timeout and reports a measurement report.

S904. The base station delivers second measurement configuration information to the terminal, where the second measurement configuration information includes a measurement gap (GAP) for measurement at an inter-frequency or inter-system frequency point, and a mobility parameter at the inter-frequency or inter-system frequency point.

S905. The terminal measures an inter-frequency or inter-system neighboring cell according to the second measurement configuration information in S904, and when no inter-frequency or inter-system neighboring cell meets a measurement condition, an RLF occurs in cell 1 of the terminal, the terminal re-establishes an RRC connection, and the terminal reports the cell identity of cell 1 and the event information corresponding to cell 1 to the base station that controls the cell where the RRC connection is re-established.

Alternatively, the terminal may carry the cell identity of cell 1 and the event information corresponding to cell 1 into an RLF report and send the RLF report to the base station that controls the cell where the RRC connection is re-established. The cell where the RRC connection is re-established may or may not be the source cell. This embodiment uses the following scenario as an example for description: The cell where the RRC connection is re-established is not the source cell, and the cell where the RRC connection is re-established and the source cell belong to different base stations.

This embodiment provides the following implementation scenario: If the time when the signal quality of cell 1 meets the preset signal quality threshold exceeds the preset TTT length, the RLF occurs on the source base station of the terminal, and the event information corresponding to cell 1 is an identity of TTT timeout. In this case, in S905, the event information of cell 1 that is reported by the terminal to the base station that controls the cell where the RRC connection is re-established is TTT timeout.

It should be noted that if, when the signal quality of cell 1 does not meet the preset signal quality threshold, the RLF occurs in the source cell of the terminal, that is, in a case where S905 is directly executed after S901, the event information corresponding to cell 1 is still initial status information. In this case, in S905, the event information of cell 1 that is reported by the terminal to the base station that controls the cell where the RRC connection is re-established is initial status information. If cell 1 meets the signal quality threshold, but the TTT does not expires, the RLF occurs in the source cell of the terminal, that is, in a case where S905 is directly executed after S902, the event information corresponding to cell 1 is still meeting a signal quality threshold.

Further, the terminal may further report one or more of the following information delivered by the source base station to the base station that controls the cell where the RRC connection is re-established: T310 (that is specifically a timer that determines whether an RLF occurs), N310 (a number of times for reporting Qout, where Qout is a signal quality threshold that determines whether out-of-synchronization occurs), the maximum attempts for RLC retransmission, the maximum attempts for RACH preamble retransmission, and the like, so as to help the source base station to adjust a mobility parameter of the neighboring cell.

S906. The base station that controls the cell where the RRC connection is re-established forwards the cell identity of cell 1 that is reported by the terminal and the event information corresponding to cell 1 to the source base station.

S907. The source base station adjusts a mobility parameter of cell 1 according to the event information corresponding to cell 1.

For example, if the number of times that the event information of the source cell is initial status information exceeds a preset threshold, the source base station increases a signal quality threshold in mobility parameters of the source cell.

For a method for adjusting a mobility parameter of cell 1 in S907, reference may also be made to the detailed content in the embodiment shown in FIG. 8. No further details are provided herein.

According to the technical solution provided in this embodiment, when an RLF occurs on a terminal, the terminal re-establishes an RRC connection and sends, to a base station that controls a cell where the RRC connection is re-established, a cell identity of a source cell and event information of the source cell that is recorded by the terminal before the RLF occurs. This enables the base station that controls the cell where the RRC connection is re-established to forward, to a source base station, the cell identity of the source cell and the event information of the source cell that is recorded by the terminal before the RLF occurs. Then, the source base station may adjust a mobility parameter of the source cell according to an event undergone by the source cell and send the adjusted mobility parameter to the terminal. This further improves the accuracy of mobility parameter adjustment and the terminal handover efficiency. It should be noted that if the cell where the RRC connection is re-established and the source cell belong to a same base station, the source base station may directly obtain the cell identity of the source cell and the event information of the source cell that is recorded by the terminal before the connection failure occurs, and adjust a mobility parameter of a neighboring cell.

Figure 10:
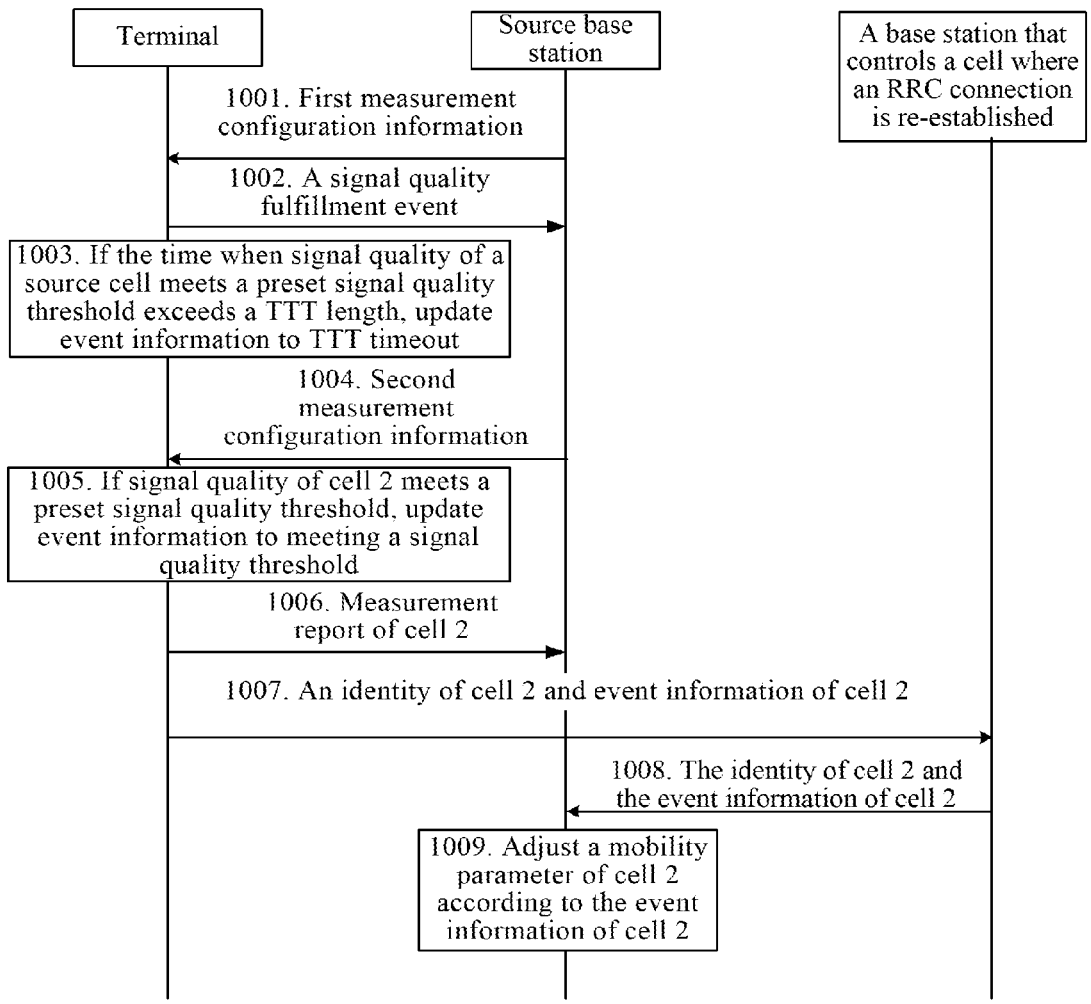
FIG. 10 is a schematic flowchart of a method according to still another embodiment of the present invention.

The following is an embodiment shown in FIG. 10. This embodiment further describes in detail the technical solutions in the embodiments shown in FIG. 7 and FIG. 8 by using the following scenario as an example: An RLF occurs on a source base station before a terminal receives a handover command sent by the source base station. This embodiment describes, by using cell 2 as a neighboring cell of a source cell, a specific process where the terminal sends a cell identity of cell 2 and event information of cell 2 to a base station that controls a cell where an RRC connection is re-established, so that the source base station adjusts a mobility parameter of cell 2 according to event information corresponding to cell 2. Cell 2 is an inter-frequency cell or inter-system cell of the source cell. This embodiment specifically includes the following content:

S1001. The terminal receives first measurement configuration information sent by the source base station and measures the source cell (that is, a current serving cell) and a neighboring cell at a same frequency as the source cell according to the first measurement configuration information.

The terminal receives the first measurement configuration information delivered by the source base station, where the first measurement configuration information instructs the terminal to measure signal quality of the source cell and the neighboring cell, and the first measurement configuration information includes mobility parameters of the source cell and the neighboring cell. A mobility parameter of the neighboring cell in the first measurement configuration information is a mobility parameter of the neighboring cell at the same frequency as the source cell. There may be one or more neighboring cells. The mobility parameters may include a signal quality threshold. For example, for a neighboring cell that is at a frequency and in a communications system that are the same as the source cell, the signal quality threshold may be an A3 threshold, where the A3 threshold is a signal quality threshold and is specifically an event threshold that is used to report a measurement report and defined in the 3GPP 36.331 standard. Signal quality may be RSRP, RSRQ, or the like.

For the neighboring cell at the same frequency as the source cell, the mobility parameters may further include a TTT length, and if the time when signal quality of the neighboring cell meets a preset signal quality threshold exceeds the TTT length, the terminal reports a measurement report to the source base station.

To briefly describe the method for adjusting a cell mobility parameter provided in the present invention, this embodiment uses the following scenario as an example: Cell 2 is a neighboring cell. In practice, the terminal may measure multiple neighboring cells.

S1002. Signal quality of the source cell measured by the terminal meets a preset signal quality threshold, and the terminal reports an event that the source cell meets signal quality.

The signal quality threshold of the source cell may be, for example, an A2 event.

S1003. If the time when the measured signal quality of the source cell has met the preset signal quality threshold exceeds a preset TTT length, the terminal updates event information corresponding to a cell identity of the source cell from meeting a signal quality threshold to TTT timeout and reports a measurement report.

S1004. The terminal receives a second measurement configuration message delivered by the source base station and measures cell 2 according to the second measurement configuration message, where the second measurement configuration message includes a time gap (GAP) for measurement at an inter-frequency or inter-system frequency point, and a mobility parameter at the inter-frequency or inter-system frequency point.

It should be noted that mobility parameters of cells at a same frequency point are the same. Therefore, the source base station may carry the time gap for measurement at the inter-frequency or inter-system frequency point and the mobility parameter at the inter-frequency or inter-system frequency point into the second measurement configuration message and send the second measurement configuration message to the terminal, so that the terminal measures the neighboring cell that is at a frequency or in a system different from the source cell.

The mobility parameter that is at the inter-frequency or inter-system frequency point and carried in the second measurement configuration information that is delivered by the source base station and received by the terminal, may include a signal quality threshold. For example, for a neighboring cell that is at a frequency different from the source cell, the signal quality threshold may be an A4 threshold; and for a neighboring cell in a system different from the source cell, the signal quality threshold may be a B1 threshold.

If the signal quality of the source cell meets the preset signal quality threshold, that is, an A2 threshold of the source cell, the terminal is triggered to measure signal quality of cell 2 at a frequency or in a communications system different from the source cell. If the signal quality in the source cell does not meet the preset signal quality threshold, the terminal does not measure the signal quality of cell 2.

S1005. If the measured signal quality of cell 2 meets the preset signal quality threshold, the terminal updates the event information corresponding to the cell identity of cell 2 from initial status information to meeting a signal quality threshold.

If cell 2 is an inter-frequency cell of the source cell, the signal quality threshold may be a A4 threshold; and if cell 2 is an inter-system cell of the source cell, the signal quality threshold may be a B1 threshold.

The preset signal quality threshold is a preset threshold indicated in the measurement configuration information delivered by the source base station.

In this embodiment, a default initial value of the event information corresponding to the cell identity of cell 2 is initial status information. When the signal quality of cell 2 meets the preset signal quality threshold, the terminal updates the event information corresponding to the cell identity of cell 2 from initial status information to meeting a signal quality threshold.

If signal quality of multiple neighboring cells of the terminal all meets the preset signal quality threshold, the terminal updates event information corresponding to a cell identity of each neighboring cell from initial status information to meeting a signal quality threshold.

S1006. The terminal reports a measurement report of cell 2 to the source base station.

S1007. An RLF occurs in the source cell of the terminal, the terminal re-establishes an RRC connection, and the terminal reports the cell identity of cell 2 and the event information corresponding to cell 2 to the base station that controls the cell where the RRC connection is re-established.

Alternatively, the terminal may carry the cell identity of cell 2 and the event information corresponding to cell 2 into an RLF report and send the RLF report to the base station that controls the cell where the RRC connection is re-established. The cell where the RRC connection is re-established may or may not be the source cell. This embodiment uses the following scenario as an example for description: The cell where the RRC connection is re-established is not the source cell, and the cell where the RRC connection is re-established and the source cell belong to different base stations.

The scenario of this embodiment is that: Only when the signal quality of cell 2 meets the preset signal quality threshold, that is, the event information corresponding to cell 2 has been updated to meeting a signal quality threshold, the RLF occurs in the source cell of the terminal. Therefore, in S1006 of this embodiment, the event information of cell 2 that is reported by the terminal to the base station that controls the cell where the RRC connection is re-established is meeting a signal quality threshold.

It should be noted that if, when the signal quality of cell 2 does not meet the preset signal quality threshold, the RLF occurs in the source cell of the terminal, that is, in a case where S1007 is directly executed after S1002, the event information corresponding to cell 2 is still initial status information. In this case, in S1007, the event information of cell 2 that is reported by the terminal to the base station that controls the cell where the RRC connection is re-established is initial status information. If, after the time when the signal quality of cell 2 meets the preset signal quality threshold exceeds the set length TTT length, the RLF occurs in the source cell of the terminal, the event information of cell 2 that is reported by the terminal to the base station that controls the cell where the RRC connection is re-established is TTT length.

Further, the terminal may further report one or more of the following information delivered by the source base station to the base station that controls the cell where the RRC connection is re-established: T310 (that is specifically a timer that determines whether an RLF occurs), N310 (a number of times for reporting Qout, where Qout is a signal quality threshold that determines whether out-of-synchronization occurs), the maximum attempts for RLC retransmission, the maximum attempts for RACH preamble retransmission, and the like, so as to help the source base station to adjust a mobility parameter of the neighboring cell.

S1008. The base station that controls the cell where the RRC connection is re-established forwards the cell identity of cell 2 and the event information corresponding to cell 2 that are reported by the terminal to the source base station.

S1009. The source base station adjusts a mobility parameter of cell 2 according to the event information corresponding to cell 2 and the source cell.

For a method for adjusting a mobility parameter of cell 2 in S1009, reference may be made to the detailed content in the preceding embodiments. No further details are provided herein.

According to the technical solution provided in this embodiment, when an RLF occurs on a terminal, the terminal re-establishes an RRC connection and sends, to a base station that controls a cell where the RRC connection is re-established, a cell identity of a neighboring cell that is at a frequency or in a system different from a source cell and event information of the neighboring cell that is recorded by the terminal before the RLF occurs. This enables the base station that controls the cell where the RRC connection is re-established to forward, to a source base station, the cell identity of the neighboring cell and the event information of the neighboring cell. Then, the source base station may adjust a mobility parameter of the neighboring cell according to an event undergone by the source cell and that undergone by the neighboring cell and send the adjusted mobility parameter to the terminal. This further improves the accuracy of mobility parameter adjustment and the terminal handover efficiency. It should be noted that if the cell where the RRC connection is re-established and the source cell belong to a same base station, the source base station may directly obtain the cell identity of the neighboring cell that is at a frequency or in a communications system different from the source cell and the event information of the neighboring cell that is recorded by the terminal before the connection failure occurs, and adjust the mobility parameter of the neighboring cell.

Figure 11:
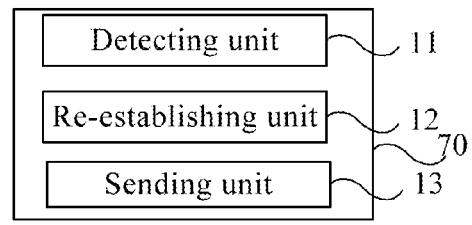
FIG. 11 is a schematic structural diagram of a terminal according to an embodiment of the present invention.

FIG. 11 is a schematic structural diagram of a terminal according to an embodiment of the present invention. As shown in FIG. 11, the terminal 70 includes a detecting unit 11, a re-establishing unit 12, and a sending unit 13.

The detecting unit 11 is configured to detect a connection failure that occurs on the terminal. The re-establishing unit 12 is configured to, when the detecting unit detects that a connection failure occurs on the terminal, re-establish a radio resource control RRC connection. The sending unit 13 is configured to: send, to a base station that controls a cell where the RRC connection is re-established, a cell identity of a source cell and event information of the source cell that is recorded by the terminal before the connection failure occurs; or send, to a base station that controls a cell where the RRC connection is re-established, a cell identity of a neighboring cell of the source cell and event information of the neighboring cell that is recorded by the terminal before the connection failure occurs, where the neighboring cell and the source cell are inter-frequency cells or inter-system cells; or send, to a base station that controls a cell where the RRC connection is re-established, a cell identity of a source cell, event information of the source cell that is recorded by the terminal before the connection failure occurs, and a cell identity of a neighboring cell of the source cell and event information of the neighboring cell that is recorded by the terminal before the connection failure occurs, where the neighboring cell and the source cell are inter-frequency cells or inter-system cells.

Alternatively, the event information of the source cell sent by the sending unit 13 includes: initial status information, meeting a signal quality threshold, or TTT timeout.

Alternatively, the event information of the neighboring cell sent by the sending unit 13 includes one of the following information: initial status information, meeting a signal quality threshold, TTT timeout, and the terminal receiving a handover command.

Alternatively, if the connection failure detected by the detecting unit 11 is an RLF that occurs in the source cell of the terminal, if, before the RLF occurs on the terminal, signal quality of the source cell does not meet a preset signal quality threshold, the event information of the source cell sent by the sending unit 13 is initial status information. Alternatively, if, before the RLF occurs on the terminal, signal quality of the source cell meets a preset signal quality threshold, the event information of the source cell sent by the sending unit 13 is meeting a signal quality threshold. Alternatively, if, before the RLF occurs on the terminal, the time when signal quality of the source cell has met a preset signal quality threshold exceeds a preset TTT length, the event information of the source cell sent by the sending unit 13 is TTT timeout.

Alternatively, if the connection failure detected by the detecting unit 11 is an RLF that occurs in the source cell of the terminal, if, before the RLF occurs on the terminal, signal quality of the neighboring cell does not meet a preset signal quality threshold, the event information of the neighboring cell sent by the sending unit 13 is initial status information. Alternatively, if, before the RLF occurs on the terminal, signal quality of the neighboring cell meets a preset signal quality threshold, the event information of the neighboring cell sent by the sending unit 13 is meeting a signal quality threshold. Alternatively, if, before the RLF occurs on the terminal, signal quality of the source cell meets a preset signal quality threshold, and the time when signal quality of the neighboring cell has met a preset signal quality threshold exceeds a preset TTT length, the event information of the neighboring cell sent by the sending unit 13 is TTT timeout.

If the connection failure detected by the detecting unit 11 is a handover failure HOF that occurs on the terminal and if, the terminal has received a handover command sent by a base station that controls the source cell, the event information of the neighboring cell sent by the sending unit 13 is the terminal receiving a handover command. Alternatively, if, when the detecting unit 11 detects that the HOF occurs on the terminal, the terminal has sent a preamble message to a base station that controls a handover target cell, the event information of the neighboring cell sent by the sending unit 13 is the terminal sending a preamble. Alternatively, if, when the detecting unit detects that the HOF occurs on the terminal, the terminal has received a preamble response message returned by a base station that controls a handover target cell, the event information of the neighboring cell sent by the sending unit 13 is the terminal acquiring a preamble response. Alternatively, if, when the detecting unit 11 detects that the HOF occurs on the terminal, the terminal has sent a first uplink scheduling message to a base station that controls a handover target cell, the event information of the neighboring cell sent by the sending unit 13 is the terminal sending a scheduling message. Alternatively, if, when the detecting unit 11 detects that the HOF occurs on the terminal, the terminal has received information that instructs how to resolve a collision and is returned by a base station that controls a handover target cell, the event information of the neighboring cell sent by the sending unit 13 is the terminal receiving information that instructs how to resolve a collision. Alternatively, if, when the detecting unit detects that the HOF occurs on the terminal, the terminal has received configured preamble information delivered by a base station that controls a handover target cell, the event information of the neighboring cell sent by the sending unit 13 is the terminal receiving configured preamble information.

Alternatively, the sending unit 13 is further configured to send one or more of the following parameters delivered by the base station that controls the source cell to the base station that controls the target cell: a timer, which is configured to determine whether an RLF occurs; a number of times, which is configured to determine whether to enable out-of-synchronization indication of the timer; a number of times, which is configured to determine whether to disable synchronization indication of the timer; the maximum retransmission attempts at a radio link control layer; and the maximum preamble retransmission attempts.

The terminal according to this embodiment may implement the content that is operated by the terminal in the method embodiments shown in FIG. 7-FIG. 10. No further details are provided herein.

According to this embodiment of the present invention, when a connection failure occurs, the terminal re-establishes an RRC connection and sends, to a base station that controls a cell where the RRC connection is re-established, a cell identity of a source cell and event information of the source cell that is recorded by the terminal before the connection failure occurs; or sends, to a base station that controls a cell where the RRC connection is re-established, a cell identity of a neighboring cell that is at a frequency or in a communications system different from the source cell and event information of the neighboring cell; or sends, to a base station that controls a cell where the RRC connection is re-established, a cell identity of a source cell, event information of the source cell, and a cell identity of a neighboring cell and event information of the neighboring cell so that the base station that controls the cell where the RRC connection is re-established forwards the preceding information reported by the terminal to a source base station, and then, the source base station may adjust a mobility parameter according to an event undergone by the source cell and/or an event undergone by the neighboring cell that is at a frequency or in a system different from the source cell, thereby improving the accuracy of mobility parameter adjustment and the terminal handover efficiency.

Figure 12:
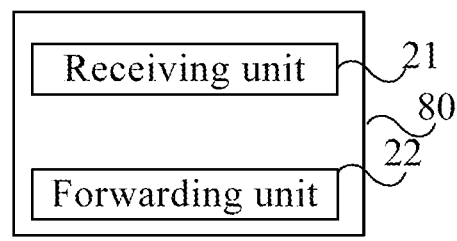
FIG. 12 is a schematic structural diagram of a base station according to an embodiment of the present invention.

FIG. 12 is a schematic structural diagram of a base station according to an embodiment of the present invention. As shown in FIG. 12, the base station 80 includes a receiving unit 21 and a forwarding unit 22.

The receiving unit 21 is configured to, after a connection failure occurs and a terminal re-establishes an RRC connection, receive information reported by the terminal. The forwarding unit 22 is configured to forward information that is reported by the terminal and is received by the receiving unit to a base station that controls a source cell. The information reported by the terminal includes a cell identity of the source cell and event information of the source cell that is recorded by the terminal before the connection failure occurs; or includes a cell identity of a neighboring cell of the source cell and event information of the neighboring cell that is recorded by the terminal before the connection failure occurs; or includes a cell identity of the source cell, event information of the source cell that is recorded by the terminal before the connection failure occurs, a cell identity of the neighboring cell of the source cell and event information of the neighboring cell that is recorded by the terminal before the connection failure occurs, where the neighboring cell and the source cell are inter-frequency cells or inter-system cells.

Alternatively, the event information of the source cell acquired by the receiving unit 21 includes: initial status information, meeting a signal quality threshold, or TTT timeout.

Alternatively, the event information of the neighboring cell acquired by the receiving unit 21 includes one of the following information: initial status information, meeting a signal quality threshold, TTT timeout, and the terminal receiving a handover command.

If the connection failure that occurs on the terminal is a radio link failure RLF that occurs in the source cell of the terminal and if, before the RLF occurs on the terminal, signal quality of the source cell does not meet a preset signal quality threshold, the event information of the source cell received by the receiving unit 21 is initial status information. Alternatively, if, before the RLF occurs on the terminal, signal quality of the source cell meets a preset signal quality threshold, the event information of the source cell received by the receiving unit 21 is meeting the signal quality threshold. Alternatively, if, before the RLF occurs on the terminal, the time when signal quality of the source cell meets a preset signal quality threshold exceeds a preset time to trigger TTT length, the event information of the source cell received by the receiving unit 21 is TTT timeout.

If the connection failure that occurs on the terminal is a radio link failure RLF that occurs in the source cell of the terminal and if, before the RLF occurs on the terminal, signal quality of the neighboring cell does not meet a preset signal quality threshold, the event information of the neighboring cell received by the receiving unit 21 is initial status information. Alternatively, if, before the RLF occurs on the terminal, signal quality of the neighboring cell meets a preset signal quality threshold, the event information of the neighboring cell received by the receiving unit 21 is meeting the signal quality threshold. Alternatively, if, before the RLF occurs on the terminal, the time when signal quality of the neighboring cell meets a preset signal quality threshold exceeds a preset time to trigger TTT length, the event information of the neighboring cell received by the receiving unit 21 is TTT timeout.

If the connection failure that occurs on the terminal is a handover failure HOF that occurs on the terminal and if, when the HOF occurs on the terminal, the terminal has received a handover command sent by the base station that controls the source cell, the event information of the neighboring cell received by the receiving unit 21 is the terminal receiving a handover command. Alternatively, if, when the HOF occurs on the terminal, the terminal has sent a preamble message to a base station that controls a handover target cell, the event information of the neighboring cell received by the receiving unit 21 is the terminal sending a preamble. Alternatively, if, when the HOF occurs on the terminal, the terminal has received a preamble response message returned by a base station that controls a handover target cell, the event information of the neighboring cell received by the receiving unit 21 is the terminal acquiring a preamble response. Alternatively, if, when the HOF occurs on the terminal, the terminal has sent a first uplink scheduling message to a base station that controls a handover target cell, the event information of the neighboring cell received by the receiving unit 21 is the terminal sending a scheduling message. Alternatively, if, when the HOF occurs on the terminal, the terminal has received information that instructs how to resolve a collision and is returned by a base station that controls a handover target cell, the event information of the neighboring cell received by the receiving unit 21 is the terminal receiving information that instructs how to resolve a collision. Alternatively, if, when the HOF occurs on the terminal, the terminal has received configured preamble information delivered by a base station that controls a handover target cell, the event information of the neighboring cell received by the receiving unit 21 is the terminal receiving configured preamble information.

The base station according to this embodiment of the present invention is a source base station of the terminal, and corresponding to the method for adjusting a cell mobility parameter in the embodiment shown in FIG. 8, is a device for executing the method embodiment. For a specific execution process thereof, reference may be made to the method embodiment, and no further details are provided herein.

According to the technical solution provided in this embodiment, a base station that controls a cell where an RRC connection is re-established receives the following information reported by a terminal: a cell identity of a source cell and event information of the source cell that is recorded by the terminal before the connection failure occurs; or a cell identity of a neighboring cell that is at a frequency or in a communications system different from the source cell and event information of the neighboring cell; or a cell identity of a source cell and event information of the source cell, and a cell identity of a neighboring cell and event information of the neighboring cell. The base station that controls the cell where the RRC connection is re-established may forward the preceding information reported by the terminal to a base station that controls the source cell. Then, the base station that controls the source cell may adjust a mobility parameter of the source cell according to an event undergone by the source cell, and may also adjust a mobility parameter of the neighboring cell according to the event undergone by the source cell and that undergone by the neighboring cell that is at a frequency or in a system different from the source cell, thereby improving the accuracy of mobility parameter adjustment and the terminal handover efficiency.

Finally, it should be noted that the foregoing embodiments are merely intended for describing the technical solutions of the present invention other than limiting the present invention. Although the present invention is described in detail with reference to the foregoing embodiments, Persons of ordinary skill in the art should understand that they may still make modifications to the technical solutions described in the foregoing embodiments, or make equivalent replacements to some technical features thereof, without departing from the scope of the technical solutions of the embodiments of the present invention.

What is claimed is:

1. A method for reporting cell information, the method comprising:
   determining, by a terminal, before a connection failure occurs on the terminal, that a signal quality of a neighboring cell of a source cell meets a preset signal quality threshold and that a preset time to trigger (TTT) duration does not expire;
   setting, by the terminal, in response to determining that the signal quality meets the preset signal quality threshold, an event information of the neighboring cell meeting a signal quality threshold;
   re-establishing, by the terminal, a radio resource control (RRC) connection with a cell after the connection failure occurs on the terminal; and
   sending, by the terminal, to a base station that controls the cell where the RRC connection is re-established, a cell identity of the neighboring cell of the source cell and the event information of the neighboring cell that is recorded by the terminal before the connection failure occurs, wherein the event information of the neighboring cell, that includes information of the last event of the neighboring cell before the connection failure occurs, is sent along with the cell identity of the neighboring cell.

2. The method according to claim 1, wherein the event information of the neighboring cell further comprises one of the following information: initial status information, time to trigger (TTT) timeout, and the terminal receiving a handover command.

3. The method according to claim 1, wherein the connection failure that occurs on the terminal is a radio link failure (RLF) that occurs on the terminal in the source cell.

4. The method according to claim 1, wherein the connection failure that occurs on the terminal is a handover failure (HOF) that occurs on the terminal.

5. The method according to claim 4, wherein the method further comprises:
   determining, before the HOF occurs on the terminal, that the terminal has received a handover command sent by a base station that controls the source cell and
   setting, in response to determining that the terminal has received a handover command, the event information of the neighboring cell to the terminal receiving a handover command.

6. A terminal comprising:
   a processor;
   a memory storing a program comprising instructions to be executed on the processor, wherein the instructions cause the processor to:
      determine, before a connection failure occurs on the terminal, that a signal quality of a neighboring cell of a source cell meets a preset signal quality threshold and that a preset time to trigger (TTT) duration does not expire,
      set, in response to determining that the signal quality meets the preset signal quality threshold, an event information of the neighboring cell meeting a signal quality threshold, and
      re-establish a radio resource control (RRC) connection with a cell when the connection failure occurs on the terminal; and
   a transmitter configured to send, to a base station that controls the cell where the RRC connection is re-established, a cell identity of the neighboring cell of the source cell and the event information of the neighboring cell that is recorded by the terminal before the connection failure occurs, wherein the event information of the neighboring cell, that includes information of the last event of the neighboring cell before the connection failure occurs, is sent along with the cell identity of the neighboring cell.

7. The terminal according to claim 6, wherein the event information of the neighboring cell sent by the transmitter further comprises one of the following information: initial status information, time to trigger (TTT) timeout, and the terminal receiving a handover command.

8. The terminal according to claim 6, wherein the connection failure is a radio link failure (RLF) that occurs on the terminal in the source cell.

9. The terminal according to claim 8, wherein the instructions further cause the processor to:
   set, before the connection failure occurs on the terminal, the event information of the neighboring cell to initial status information.

10. The terminal according to claim 8, wherein the instructions further cause the processor to:
    determine, before the RLF occurs on the terminal, that the signal quality of the neighboring cell meets the preset signal quality threshold and that the preset time to trigger (TTT) duration is exceeded and
    set, in response to determining that the signal quality meets the preset signal quality threshold and the preset time to trigger duration is exceeded, the event information of the neighboring cell to TTT timeout.

11. The terminal according to claim 6, wherein the connection failure is a handover failure (HOF) that occurs on the terminal.

12. The terminal according to claim 11, wherein the instructions further cause the processor to:
    determine, before the HOF occurs on the terminal, that the terminal has received a handover command sent by a base station that controls the source cell and
    set, in response to determining that the terminal has received the handover command, the event information of the neighboring cell to the terminal receiving a handover command.

13. The terminal according to claim 11, wherein the processor is further configured to:
   determine, before the HOF occurs on the terminal, that the terminal has sent a preamble message to a base station that controls a handover target cell and
   set, in response to determining that the terminal has sent the preamble message, the event information of the neighboring cell to the terminal sending a preamble.

14. The terminal according to claim 11, wherein the processor is further configured to:
   determine, before the HOF occurs on the terminal, that the terminal has received a preamble response message returned by a base station that controls a handover target cell and
   set, in response to determining that the terminal has received the preamble message, the event information of the neighboring cell to the terminal acquiring a preamble response.

15. The terminal according to claim 11, wherein the processor is further configured to:
   determine, before the HOF occurs on the terminal, that the terminal has sent a first uplink scheduling message to a base station that controls a handover target cell and
   set, in response to determining that the terminal has sent the first uplink scheduling message, the event information of the neighboring cell to the terminal sending a scheduling message.

16. The terminal according to claim 11, wherein the processor is further configured to:
   determine, before the HOF occurs on the terminal, that the terminal has received information that instructs how to resolve a collision and is returned by a base station that controls a handover target cell and
   set, in response to determining that the terminal has received the information, the event information of the neighboring cell to the terminal receiving information that instructs how to resolve a collision.

17. The terminal according to claim 11, wherein the instructions further cause the processor to:
   determine, before the HOF occurs on the terminal, that the terminal has received configured preamble information delivered by a base station that controls a handover target cell and
   set, in response to determining, that the terminal has received the configured preamble information, the event information of the neighboring cell to the terminal receiving configured preamble information.

18. A base station comprising:
   a transceiver, wherein the transceiver is configured to acquire a cell identity of a neighboring cell of a source cell that is reported by a terminal after a connection failure occurs and event information of the neighboring cell that is recorded by the terminal before the connection failure occurs, wherein the event information of the neighboring cell, that includes information of the last event of the neighboring cell before the connection failure occurs, is sent along with the cell identity of the neighboring cell; and
   a processor, wherein the processor is configured to adjust a mobility parameter of the neighboring cell based on the event information of the neighboring cell that is acquired by the transceiver and recorded by the terminal before the connection failure occurs, wherein, before the connection failure occurs on the terminal, when a signal quality of the neighboring cell meets a preset signal quality threshold and time to trigger (TTT) does not expire, the event information of the neighboring cell received from the terminal is meeting a signal quality threshold.

19. The base station according to claim 18, wherein the source cell and a cell where the terminal re-establishes an RRC connection after the connection failure occurs belong to a same base station; and wherein the transceiver is further configured to, after the terminal re-establishes the RRC connection, receive the cell identity of the neighboring cell of the source cell and the event information of the neighboring cell that are reported by the terminal and that is recorded by the terminal before the connection failure occurs.

20. The base station according to claim 18, wherein the source cell and a cell where the terminal re-establishes an RRC connection after the connection failure occurs belong to different base stations; and wherein the transceiver is further configured to, after the terminal re-establishes the RRC connection, receive the cell identity of the neighboring cell of the source cell that is forwarded by a base station that controls the cell where the RRC connection is re-established and the event information of the neighboring cell that is recorded by the terminal before the connection failure occurs.

21. The base station according to claim 18, wherein the event information of the neighboring cell acquired by the transceiver comprises one of the following information: initial status information, time to trigger TTT timeout, and the terminal receiving a handover command.

* * * * *